(12) United States Patent
Mizusawa

(10) Patent No.: US 8,310,769 B2
(45) Date of Patent: Nov. 13, 2012

(54) OPTICAL SYSTEM

(75) Inventor: Masayuki Mizusawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 140 days.

(21) Appl. No.: 12/924,595

(22) Filed: Sep. 29, 2010

(65) Prior Publication Data

US 2011/0181965 A1    Jul. 28, 2011

(30) Foreign Application Priority Data

Sep. 30, 2009  (JP) ................................ 2009-228456

(51) Int. Cl.
*G02B 17/00*  (2006.01)
(52) U.S. Cl. ......... 359/736; 359/727; 359/725; 359/733
(58) Field of Classification Search .................. 359/725, 359/736, 733, 734, 735, 727
See application file for complete search history.

(56) References Cited

U.S. PATENT DOCUMENTS

| | | | |
|---|---|---|---|
| 5,768,039 A * | 6/1998 | Togino ........................... | 359/726 |
| 6,885,509 B2 * | 4/2005 | Wallerstein et al. .......... | 359/725 |
| 7,929,219 B2 * | 4/2011 | Togino ........................... | 359/736 |
| 2004/0254424 A1 | 12/2004 | Simkulet et al. | |

FOREIGN PATENT DOCUMENTS

| | | |
|---|---|---|
| JP | 2007-233036 | 9/2007 |
| JP | 2008-309859 | 12/2008 |
| WO | WO 03/042743 | 5/2003 |
| WO | WO 2005/110186 | 11/2005 |
| WO | WO2008/153114 | * 12/2008 |

OTHER PUBLICATIONS http://www.ohara-inc.co.jp/en/product/optical/list/index.html.*

* cited by examiner

*Primary Examiner* — Ricky Mack
*Assistant Examiner* — Zachary Wilkes
(74) *Attorney, Agent, or Firm* — Kenyon & Kenyon LLP

(57) ABSTRACT

An optical system includes a negative front group having a component of first and second lenses cemented together, an aperture stop, and a positive rear group. The component has: a first face, on the front-direction-object side of the first lens, having a first transmitting surface and an annularly-formed first reflecting surface facing the image side; a second face, at the cemented surface, having a second transmitting surface and an annularly-formed second reflecting surface facing the front-direction-object side; a third face as a transmitting surface on the image side of the second lens; and a fourth face as a transmitting circumferential face of the first lens. The component satisfies the conditions:

$$|n_{d\_RL1} - n_{d\_RL2}| < 0.3$$

$$|v_{d\_RL1} - v_{d\_RL2}| < 40$$

where $n_{d\_RL1}$ and $n_{d\_RL2}$ are refractive indices for d line, of the first and second lenses, respectively, and $v_{d\_RL1}$ and $v_{d\_RL2}$ are Abbe's numbers for d line, of the first and second lenses, respectively.

8 Claims, 32 Drawing Sheets

COMA ON MERIDIONAL PLANE

HALF FIELD ANGLE (60.00)°

COMA ON MERIDIONAL PLANE

HALF FIELD ANGLE (55.00)°

COMA ON MERIDIONAL PLANE

HALF FIELD ANGLE (45.00)°

COMA ON MERIDIONAL PLANE

HALF FIELD ANGLE (30.00)°

COMA ON MERIDIONAL PLANE

HALF FIELD ANGLE (0.00)°

——————— 656.2700 NM     ——————— 486.1000 NM
------------------ 587.5600 NM     ——·——·—— 435.8300 NM
——·—·—·—— 546.0700 NM

COMA ON SAGITTAL PLANE

HALF FIELD ANGLE (60.00)°

COMA ON SAGITTAL PLANE

HALF FIELD ANGLE (55.00)°

COMA ON SAGITTAL PLANE

HALF FIELD ANGLE (45.00)°

COMA ON SAGITTAL PLANE

HALF FIELD ANGLE (30.00)°

COMA ON SAGITTAL PLANE

HALF FIELD ANGLE (0.00)°

——————— 656.2700 NM  ---------- 486.1000 NM
------------------ 587.5600 NM  —--—--— 435.8300 NM
—-—-—-— 546.0700 NM

COMA ON MERIDIONAL PLANE

HALF FIELD ANGLE (135.00)°

COMA ON MERIDIONAL PLANE

HALF FIELD ANGLE (125.00)°

COMA ON MERIDIONAL PLANE

HALF FIELD ANGLE (115.00)°

COMA ON MERIDIONAL PLANE

HALF FIELD ANGLE (105.00)°

COMA ON MERIDIONAL PLANE

HALF FIELD ANGLE (90.00)°

——————— 656.2700 NM  
----------- 587.5600 NM  
—·—·—·— 546.0700 NM  
- - - - - - 486.1000 NM  
—··—··— 435.8300 NM

COMA ON SAGITTAL PLANE

HALF FIELD ANGLE (135.00)°

COMA ON SAGITTAL PLANE

HALF FIELD ANGLE (125.00)°

COMA ON SAGITTAL PLANE

HALF FIELD ANGLE (115.00)°

COMA ON SAGITTAL PLANE

HALF FIELD ANGLE (105.00)°

COMA ON SAGITTAL PLANE

HALF FIELD ANGLE (90.00)°

——————— 656.2700 NM  - - - - - - - 486.1000 NM
- - - - - - - 587.5600 NM  — - - — - - 435.8300 NM
— - — - — - — 546.0700 NM

COMA ON
MERIDIONAL PLANE

HALF FIELD ANGLE
(60.00)°

COMA ON
MERIDIONAL PLANE

HALF FIELD ANGLE
(55.00)°

COMA ON
MERIDIONAL PLANE

HALF FIELD ANGLE
(45.00)°

COMA ON
MERIDIONAL PLANE

HALF FIELD ANGLE
(30.00)°

COMA ON
MERIDIONAL PLANE

HALF FIELD ANGLE
(0.00)°

——————— 656.2700 NM           ——————— 486.1000 NM
------------------- 587.5600 NM           ———·——— 435.8300 NM
——·——·— 546.0700 NM

COMA ON
SAGITTAL PLANE

HALF FIELD ANGLE
(60.00)°

COMA ON
SAGITTAL PLANE

HALF FIELD ANGLE
(55.00)°

COMA ON
SAGITTAL PLANE

HALF FIELD ANGLE
(45.00)°

COMA ON
SAGITTAL PLANE

HALF FIELD ANGLE
(30.00)°

COMA ON
SAGITTAL PLANE

HALF FIELD ANGLE
(0.00)°

——————— 656.2700 NM    ——————— 486.1000 NM
---------------- 587.5600 NM    —·—·—·— 435.8300 NM
—··—··— 546.0700 NM

COMA ON
MERIDIONAL PLANE

HALF FIELD ANGLE
(90.00)°

COMA ON
MERIDIONAL PLANE

HALF FIELD ANGLE
(85.00)°

COMA ON
MERIDIONAL PLANE

HALF FIELD ANGLE
(80.00)°

COMA ON
MERIDIONAL PLANE

HALF FIELD ANGLE
(70.00)°

COMA ON
MERIDIONAL PLANE

HALF FIELD ANGLE
(60.00)°

——————— 656.2700 NM      --------- 486.1000 NM
----------- 587.5600 NM      —-—-—- 435.8300 NM
—-—-—-— 546.0700 NM

COMA ON SAGITTAL PLANE

HALF FIELD ANGLE (90.00)°

COMA ON SAGITTAL PLANE

HALF FIELD ANGLE (85.00)°

COMA ON SAGITTAL PLANE

HALF FIELD ANGLE (80.00)°

COMA ON SAGITTAL PLANE

HALF FIELD ANGLE (70.00)°

COMA ON SAGITTAL PLANE

HALF FIELD ANGLE (60.00)°

——————— 656.2700 NM   —————— 486.1000 NM
------------------- 587.5600 NM   ——·—·—— 435.8300 NM
—··—··— 546.0700 NM

COMA ON MERIDIONAL PLANE

HALF FIELD ANGLE (60.00)°

COMA ON MERIDIONAL PLANE

HALF FIELD ANGLE (55.00)°

COMA ON MERIDIONAL PLANE

HALF FIELD ANGLE (45.00)°

COMA ON MERIDIONAL PLANE

HALF FIELD ANGLE (30.00)°

COMA ON MERIDIONAL PLANE

HALF FIELD ANGLE (0.00)°

——————— 656.2700 NM         ————————— 486.1000 NM
----------------- 587.5600 NM         ——— - ——— - ——— 435.8300 NM
——— - ——— - ——— 546.0700 NM

COMA ON
SAGITTAL PLANE

HALF FIELD ANGLE
(60.00)°

COMA ON
SAGITTAL PLANE

HALF FIELD ANGLE
(55.00)°

COMA ON
SAGITTAL PLANE

HALF FIELD ANGLE
(45.00)°

COMA ON
SAGITTAL PLANE

HALF FIELD ANGLE
(30.00)°

COMA ON
SAGITTAL PLANE

HALF FIELD ANGLE
(0.00)°

——————— 656.2700 NM     — — — — — — 486.1000 NM
- - - - - - - - - 587.5600 NM     — — · — — · — 435.8300 NM
— · · — · · — 546.0700 NM

COMA ON MERIDIONAL PLANE

HALF FIELD ANGLE (135.00)°

COMA ON MERIDIONAL PLANE

HALF FIELD ANGLE (125.00)°

COMA ON MERIDIONAL PLANE

HALF FIELD ANGLE (115.00)°

COMA ON MERIDIONAL PLANE

HALF FIELD ANGLE (105.00)°

COMA ON MERIDIONAL PLANE

HALF FIELD ANGLE (90.00)°

——————— 656.2700 NM   — — — — — 486.1000 NM
------------------- 587.5600 NM   —··—··— 435.8300 NM
—·—·—·— 546.0700 NM

COMA ON SAGITTAL PLANE

HALF FIELD ANGLE (135.00)°

COMA ON SAGITTAL PLANE

HALF FIELD ANGLE (125.00)°

COMA ON SAGITTAL PLANE

HALF FIELD ANGLE (115.00)°

COMA ON SAGITTAL PLANE

HALF FIELD ANGLE (105.00)°

COMA ON SAGITTAL PLANE

HALF FIELD ANGLE (90.00)°

---- 656.2700 NM      --------- 486.1000 NM
---------- 587.5600 NM      ———··——— 435.8300 NM
—··—··— 546.0700 NM

COMA ON MERIDIONAL PLANE

HALF FIELD ANGLE (60.00)°

COMA ON MERIDIONAL PLANE

HALF FIELD ANGLE (55.00)°

COMA ON MERIDIONAL PLANE

HALF FIELD ANGLE (45.00)°

COMA ON MERIDIONAL PLANE

HALF FIELD ANGLE (30.00)°

COMA ON MERIDIONAL PLANE

HALF FIELD ANGLE (0.00)°

————————— 656.2700 NM       ---------- 486.1000 NM
----------------- 587.5600 NM       —--—--— 435.8300 NM
—-—-—-—  546.0700 NM

COMA ON
SAGITTAL PLANE

HALF FIELD ANGLE
(60.00)°

COMA ON
SAGITTAL PLANE

HALF FIELD ANGLE
(55.00)°

COMA ON
SAGITTAL PLANE

HALF FIELD ANGLE
(45.00)°

COMA ON
SAGITTAL PLANE

HALF FIELD ANGLE
(30.00)°

COMA ON
SAGITTAL PLANE

HALF FIELD ANGLE
(0.00)°

——————— 656.2700 NM     - - - - - - - 486.1000 NM
- - - - - - - - - 587.5600 NM     — - - — - - — 435.8300 NM
— - — - — - — 546.0700 NM

COMA ON MERIDIONAL PLANE

HALF FIELD ANGLE (90.00)°

COMA ON MERIDIONAL PLANE

HALF FIELD ANGLE (85.00)°

COMA ON MERIDIONAL PLANE

HALF FIELD ANGLE (80.00)°

COMA ON MERIDIONAL PLANE

HALF FIELD ANGLE (70.00)°

COMA ON MERIDIONAL PLANE

HALF FIELD ANGLE (60.00)°

——————— 656.2700 NM          — — — — — 486.1000 NM
-------------- 587.5600 NM          —  —  —  — 435.8300 NM
— — — — — 546.0700 NM

COMA ON SAGITTAL PLANE

HALF FIELD ANGLE (90.00)°

COMA ON SAGITTAL PLANE

HALF FIELD ANGLE (85.00)°

COMA ON SAGITTAL PLANE

HALF FIELD ANGLE (80.00)°

COMA ON SAGITTAL PLANE

HALF FIELD ANGLE (70.00)°

COMA ON SAGITTAL PLANE

HALF FIELD ANGLE (60.00)°

——————— 656.2700 NM   — — — — — 486.1000 NM
- - - - - - - - 587.5600 NM   —-—-—-— 435.8300 NM
—-—-—-— 546.0700 NM

COMA ON MERIDIONAL PLANE

HALF FIELD ANGLE (60.00)°

COMA ON MERIDIONAL PLANE

HALF FIELD ANGLE (55.00)°

COMA ON MERIDIONAL PLANE

HALF FIELD ANGLE (45.00)°

COMA ON MERIDIONAL PLANE

HALF FIELD ANGLE (30.00)°

COMA ON MERIDIONAL PLANE

HALF FIELD ANGLE (0.00)°

——————— 656.2700 NM
----------- 587.5600 NM
—·—·— 546.0700 NM
- - - - - - 486.1000 NM
—··—··— 435.8300 NM

COMA ON
SAGITTAL PLANE

HALF FIELD ANGLE
(60.00)°

COMA ON
SAGITTAL PLANE

HALF FIELD ANGLE
(55.00)°

COMA ON
SAGITTAL PLANE

HALF FIELD ANGLE
(45.00)°

COMA ON
SAGITTAL PLANE

HALF FIELD ANGLE
(30.00)°

COMA ON
SAGITTAL PLANE

HALF FIELD ANGLE
(0.00)°

——————————— 656.2700 NM         ------------ 486.1000 NM
------------------- 587.5600 NM         —-—-—-— 435.8300 NM
—-—-—-— 546.0700 NM

COMA ON MERIDIONAL PLANE

HALF FIELD ANGLE (135.00)°

COMA ON MERIDIONAL PLANE

HALF FIELD ANGLE (125.00)°

COMA ON MERIDIONAL PLANE

HALF FIELD ANGLE (115.00)°

COMA ON MERIDIONAL PLANE

HALF FIELD ANGLE (105.00)°

COMA ON MERIDIONAL PLANE

HALF FIELD ANGLE (90.00)°

――――――――― 656.2700 NM          ― ― ― ― ― 486.1000 NM
----------------- 587.5600 NM          ―・・―・・― 435.8300 NM
―・―・―・― 546.0700 NM

COMA ON SAGITTAL PLANE

HALF FIELD ANGLE (135.00)°

COMA ON SAGITTAL PLANE

HALF FIELD ANGLE (125.00)°

COMA ON SAGITTAL PLANE

HALF FIELD ANGLE (115.00)°

COMA ON SAGITTAL PLANE

HALF FIELD ANGLE (105.00)°

COMA ON SAGITTAL PLANE

HALF FIELD ANGLE (90.00)°

——————— 656.2700 NM  – – – – – – – 486.1000 NM
·················· 587.5600 NM  —··—··— 435.8300 NM
—·—·—·— 546.0700 NM

COMA ON MERIDIONAL PLANE

HALF FIELD ANGLE (60.00)°

COMA ON MERIDIONAL PLANE

HALF FIELD ANGLE (55.00)°

COMA ON MERIDIONAL PLANE

HALF FIELD ANGLE (45.00)°

COMA ON MERIDIONAL PLANE

HALF FIELD ANGLE (30.00)°

COMA ON MERIDIONAL PLANE

HALF FIELD ANGLE (0.00)°

——————— 656.2700 NM
------------------ 587.5600 NM
—·—·—·— 546.0700 NM
------------ 486.1000 NM
—··—··— 435.8300 NM

COMA ON SAGITTAL PLANE

HALF FIELD ANGLE (60.00)°

COMA ON SAGITTAL PLANE

HALF FIELD ANGLE (55.00)°

COMA ON SAGITTAL PLANE

HALF FIELD ANGLE (45.00)°

COMA ON SAGITTAL PLANE

HALF FIELD ANGLE (30.00)°

COMA ON SAGITTAL PLANE

HALF FIELD ANGLE (0.00)°

——————— 656.2700 NM    ---------- 486.1000 NM
------------- 587.5600 NM    —·——·—— 435.8300 NM
—··——··— 546.0700 NM

COMA ON MERIDIONAL PLANE

HALF FIELD ANGLE (90.00)°

COMA ON MERIDIONAL PLANE

HALF FIELD ANGLE (85.00)°

COMA ON MERIDIONAL PLANE

HALF FIELD ANGLE (80.00)°

COMA ON MERIDIONAL PLANE

HALF FIELD ANGLE (70.00)°

COMA ON MERIDIONAL PLANE

HALF FIELD ANGLE (60.00)°

——————— 656.2700 NM  ———————— 486.1000 NM
-------------- 587.5600 NM  —·—·—·— 435.8300 NM
—··—··—··— 546.0700 NM

COMA ON SAGITTAL PLANE

HALF FIELD ANGLE (90.00)°

COMA ON SAGITTAL PLANE

HALF FIELD ANGLE (85.00)°

COMA ON SAGITTAL PLANE

HALF FIELD ANGLE (80.00)°

COMA ON SAGITTAL PLANE

HALF FIELD ANGLE (70.00)°

COMA ON SAGITTAL PLANE

HALF FIELD ANGLE (60.00)°

——————— 656.2700 NM        — — — — — 486.1000 NM
··············· 587.5600 NM        —··—··— 435.8300 NM
—·—·—·— 546.0700 NM

OPTICAL SYSTEM

This application claims benefits of Japanese Patent Application No. 2009-228456 filed in Japan on Sep. 30, 2009, the contents of which are hereby incorporated by reference.

BACKGROUND OF THE INVENTION

1) Field of the Invention

The present invention relates to an optical system that makes it possible to achieve simultaneous observation of a front-direction object and a substantially-lateral-direction object.

2) Description of the Related Art

Conventionally, there have been known optical systems that make it possible to achieve simultaneous observation of a front-direction object and a substantially-lateral-direction object by a configuration in which light from the substantially-lateral-direction-object side is caused to emerge from the image side after being reflected inside the optical system (See Japanese Patent Kokai No. 2008-309859, Japanese Patent Kokai No. 2008-309859). Here, "substantially lateral direction" is defined to include not only a direction right beside the optical system but also a diagonally front direction and a diagonally back direction in reference to the optical system.

SUMMARY OF THE INVENTION

An optical system of the present invention for observation of a front-direction object and a substantially-lateral-direction object includes, in order from the front-direction-object side: a front group with a negative refracting power having a reflecting/refracting optical element; an aperture stop; and a rear group with a positive refracting power. The reflecting/refracting optical element is constructed of a first lens and a second lens arranged on the image side of the first lens, which are cemented together; has a first face that is formed on the front-direction-object side of the first lens and that has a first transmitting surface formed with an optical axis being at the center thereof and a first reflecting surface annularly formed around the first transmitting surface and directed toward the image side, a second face that is formed at the cemented surface between the first lens and the second lens and that has a second transmitting surface formed with the optical axis being at the center thereof and a second reflecting surface annularly formed around the second transmitting surface and directed toward the front-direction-object side, a third face formed as a transmitting surface on the image side of the second lens, and a fourth face formed as a transmitting surface on a circumferential face of the first lens; and satisfies the following conditions:

$$|n_{d\_RL1} - n_{d\_RL2}| < 0.3$$

$$|v_{d\_RL1} - v_{d\_RL2}| < 40$$

where $n_{d\_RL1}$ is a refractive index of the first lens for d-line rays, $n_{d\_RL2}$ is a refractive index of the second lens for d-line rays, $v_{d\_RL1}$ is an Abbe's number of the first lens for d-line rays, and $v_{d\_RL2}$ is an Abbe's number of the second lens for d-line rays.

It is preferred that the optical system of the present invention satisfies the following condition:

$$1 < |r_c/h| < 1.55$$

where $r_c$ is a radius of curvature of the cemented surface, and $h$ is an effective radius of the cemented surface.

In the optical system of the present invention, it is preferred that the first lens and the second lens are made of glass materials having a same refracting power or a same Abbe's number.

In the optical system of the present invention, it is preferred that the first lens and the second lens are made of an identical glass material.

In the optical system of the present invention, it is preferred that the front group is composed of a first lens unit with a negative refracting power and a second lens unit and the rear group is composed of a third lens unit with a positive refracting power, and that the first lens unit, the second lens unit, the aperture stop and the third lens unit form a first optical system for observation of the front-direction object, and the second lens unit, the aperture stop and the third lens unit form a second optical system for observation of the substantially-lateral-direction object.

In the optical system of the present invention, it is preferred that light from the front-direction-object side, after being incident on the first transmitting surface, is transmitted through the second transmitting surface and is made emergent toward the image side as being transmitted through the third face and that light from the substantially-lateral-direction-object side, after being incident on the fourth face, is sequentially reflected at the second reflecting surface and the first reflecting surface, is transmitted through the second transmitting surface and is made emergent toward the image side as being transmitted through the third face.

According to the present invention, it is possible to provide optical systems that facilitate simultaneous observation of a front-direction object and a substantially-lateral-direction object, where those optical systems, while being different in observation coverage on the substantially-lateral-direction-object side, can be manufactured at low cost.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
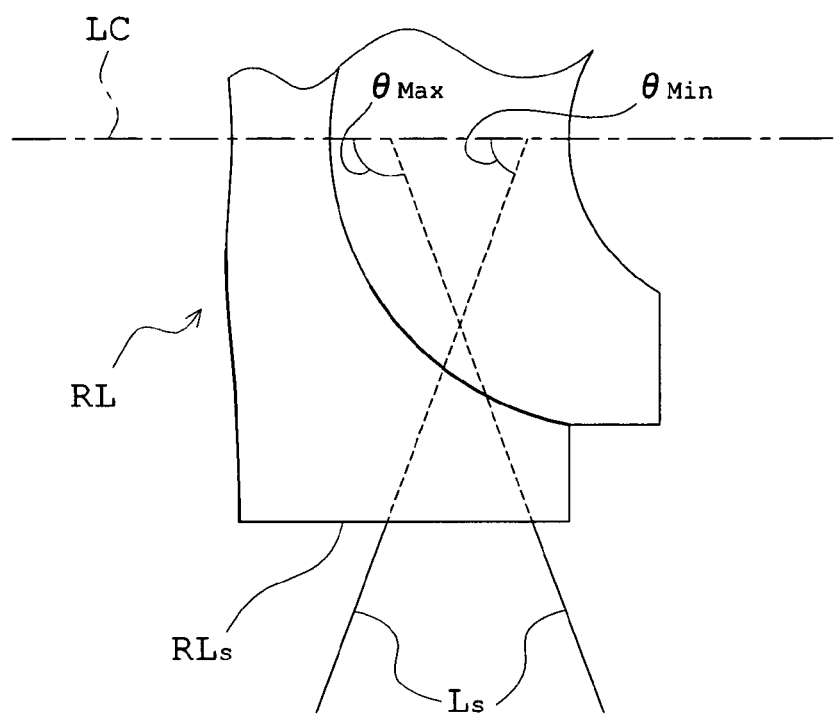
FIG. 1. is a schematic diagram that shows the angle of view with respect to light entering the reflecting/refracting optical element of the present invention as coming from the substantially-lateral-direction-object side.

Preceding explanations of the embodiments of optical systems according to the present invention, function and effect of the configuration of the present invention is explained.

In the optical system according to the present invention, the reflecting/refracting optical element is constructed of a first lens and a second lens arranged on the image side of the first lens, which are cemented together; has a first face that is formed on the front-direction-object side of the first lens and that has a first transmitting surface formed with an optical axis being at the center thereof and a first reflecting surface annularly formed around the first transmitting surface and directed toward the image side, a second face that is formed at the cemented surface between the first lens and the second lens and that has a second transmitting surface formed with the optical axis being at the center thereof and a second reflecting surface annularly formed around the second transmitting surface and directed toward the front-direction-object side, a third face formed as a transmitting surface on the image side of the second lens, and a fourth face formed as a transmitting surface on a circumferential face of the first lens.

In this way, since the optical system of the present invention is provided with a reflecting/refracting optical element that is configured to reflect light incident thereon twice inside, it is possible to observe a substantially-lateral-direction object in the non-inverted orientation while observing, simultaneously, a front-direction object. Here, the term "reflecting/refracting optical element" means a member that uses the reflecting function of light and the refracting function of light.

Furthermore, the optical system of the present invention satisfies the following conditions:

$$|n_{d\_RL1} - n_{d\_RL2}| < 0.3 \quad (1)$$

$$|v_{d\_RL1} - v_{d\_RL2}| < 40 \quad (2)$$

where $n_{d\_RL1}$ is a refractive index of the first lens for d-line rays, $n_{d\_RL2}$ is a refractive index of the second lens for d-line rays, $v_{d\_RL1}$ is an Abbe's number of the first lens for d-line rays, and $v_{d\_RL2}$ is an Abbe's number of the second lens for d-line rays.

Conditions (1) and (2) are provided for configuring the reflecting/refracting optical element in a range as not to affect rays incident thereon from the front-direction-object side. In the optical system of the present invention, the reflecting/refracting optical element is constructed of a first lens and a second lens that are made of glass materials satisfying conditions (1) and (2) and are cemented together. Therefore, it is possible to produce optical systems different in angle of view for observation with respect to rays incident thereon from the substantially-lateral-direction-object side, without substantially affecting rays incident thereon from the front-direction-object side.

In other words, as long as Conditions (1) and (2) are satisfied, a difference in angle of view for observation for the substantially-lateral-direction object, or in radius of curvature of the cemented surface of the reflecting/refracting optical element would not greatly affect rays incident thereon from the front-direction-object side. As a result, it is possible to manufacture, at low cost and without re-designing of the entire optical systems, optical systems with an identical angle of view for observation for the front-direction-object side but having different angles of view for observation for the substantially-lateral-direction-object side.

If the upper limit value of Condition (1) is exceeded, a change of refracting power caused by a change of radius of curvature of the cemented surface is so large as to result in a significant imbalance in coma between the two optical systems. If the upper limit value of Condition (2) is exceeded, a difference in chromatic aberration as generated in accordance with a change of radius of the cemented surface is rendered unneglectably large.

In the optical system of the present invention, it is preferred that the following condition is satisfied:

$$1 < |r_c/h| < 1.55 \quad (3)$$

where $r_c$ is a radius of curvature of the cemented surface, and h is an effective radius of the cemented surface.

If the lower limit value of Condition (3) is not reached, since the curvature of the cemented surface extends beyond a hemisphere, cementation is impossible. On the other hand, if the upper limit value of Condition (3) is exceeded, the angle of view for observation for the substantially-lateral-direction object is smaller than 180°, and thus a sufficient angle of view for observation cannot be assured.

In reference to the drawings, optical systems according to Embodiment 1 to Embodiment 4 are described in detail below.

The numerical subscripts in $r_1, r_2, \ldots$ and $d_1, d_2, \ldots$ shown in the sectional views of the optical systems correspond to the surface numbers $1, 2, \ldots$ of the numerical data.

In the numerical data, s denotes surface numbers, r denotes radii of curvature of surfaces, d denotes surface separations, nd denotes refractive indices for d-line rays (wavelength of 587.56 nm), vd denotes Abbe's numbers for d-line rays, k denotes conic constants, and $A_4$, $A_6$, $A_8$ and $A_{10}$ denote aspherical coefficients.

Regarding the aspherical coefficients in the numerical data, E denotes a power of ten. For example, "E−01" means ten to the negative first power. The shape of each aspherical surface is expressed by the following expression using the aspherical coefficients shown in the numerical data:

$$Z=(Y^2/r)/[1+\{1-(1+k)\cdot(Y/r)^2\}^{1/2}]+A_4Y^4+A_6Y^6+A_8Y^8+A_{10}Y^{10}+\ldots$$

where a coordinate in the direction along the optical axis is represented by Z, and a coordinate in a direction perpendicular to the optical axis is represented by Y.

In the aberration diagrams, the meridional plane is defined as a plane that contains the optical axis of the optical system and a chief ray (a plane parallel to the drawing sheet), and the sagittal plane is defined as a plane that contains the optical axis and is perpendicular to the meridional plane (a plane perpendicular to the drawing sheet). Since the optical system of the present invention is symmetrical with respect to the meridional plane, plotting of quantity of aberration on the sagittal plane is omitted in the negative domain of the horizontal axis. In each diagram showing coma, the vertical axis represents quantity of aberration, and the horizontal axis represents aperture ratio (−1 to 1). Wavelengths corresponding to the respective lines are indicated in the end of the drawing sheets.

In reference to FIG. 1, an explanation is made of the definition of angle of view with respect to light entering the reflecting/refracting optical element of the optical system of the present invention as coming from the substantially-lateral-direction-object side. FIG. 1 is a schematic diagram that shows the angle of view with respect to light entering the reflecting/refracting optical element of the present invention as coming from the substantially-lateral-direction-object side.

An angle formed, on the front-direction object side, between a chief ray of light Ls incident on a surface $RL_s$, which faces the substantially-lateral-direction-object side, and an optical axis LC is defined as a half-field angle for the substantially-lateral-object side of the reflecting/refracting optical element RL.

In the case of such a reflecting/refracting optical element RL, a front-direction object, or an object placed on the optical axis LC cannot be observed via the surface $RL_s$ facing the substantially-lateral-direction-object side. Therefore, the angle of view should include a minimum angle of view $\theta_{Min}$ and a maximum angle of view $\theta_{Max}$. The minimum angle of view $\theta_{Min}$ is an angle formed between the most front-direction-object-side chief ray, in a range observable via the surface $RL_s$ facing the substantially-lateral-direction-object side, and the optical axis. On the other hand, the maximum angle of view $\theta_{Max}$ is an angle formed between the most image-side chief ray, in the range observable via the surface $RL_s$ facing the substantially-lateral-direction-object side, and the optical axis.

Embodiment 1

In reference to FIG. 2 through FIG. 8, detailed explanations are made of two optical systems according to Embodiment 1, to be specific, optical systems that make it possible to achieve simultaneous observation of a front-direction object and a substantially-lateral-direction object, one being configured so that the observation coverage on the substantially-lateral-direction-object side is oriented rather backwardly and another being configured so that the observation coverage on the substantially-lateral-direction-object side is shifted to be oriented rather forwardly only by a change in configuration of the reflecting/refracting optical system from the former optical system.

Figure 2A:
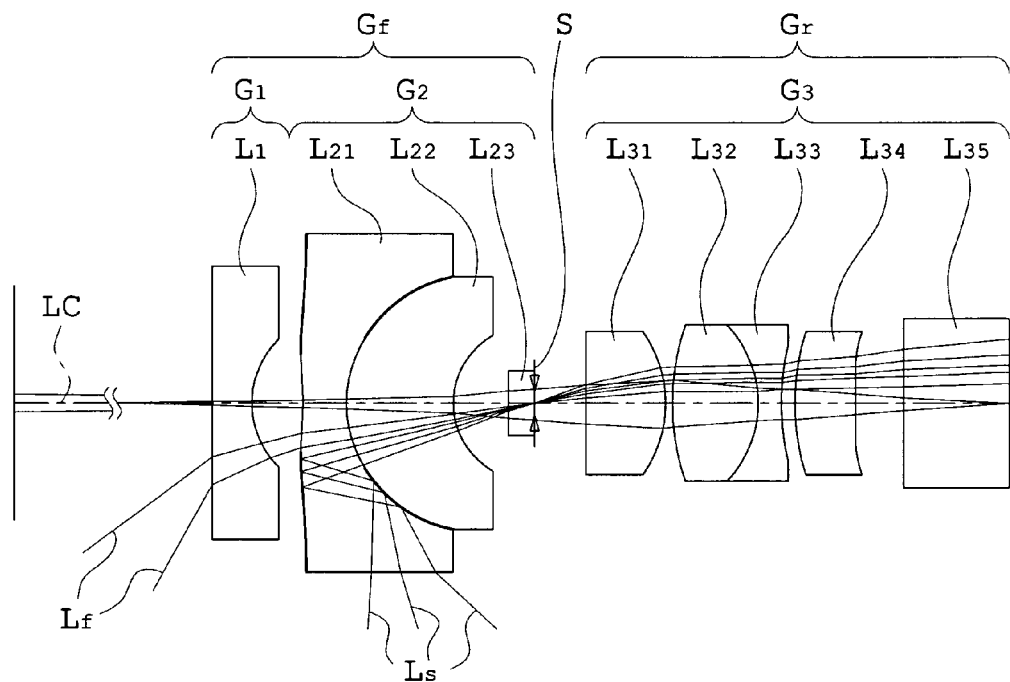
FIGS. 2A and 2B are sectional views of an optical system according to Embodiment 1 adapted such that the observation coverage on the substantially-lateral-direction-object side is oriented rather backwardly, to show lens configuration, paths of rays, and surfaces and surface separations of lenses, of the optical system.
Figure 2B:
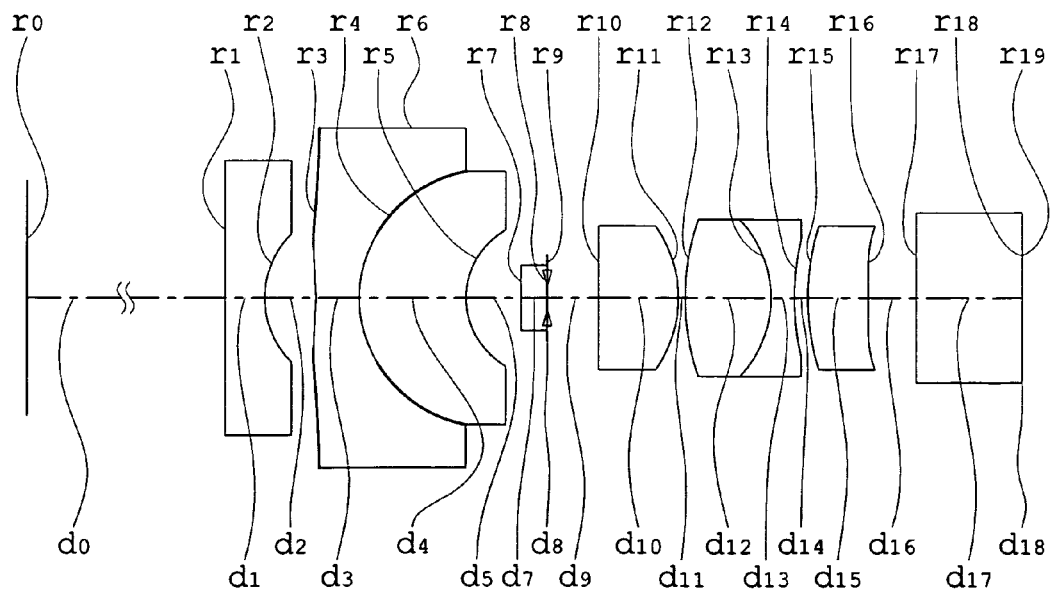
Figure 3A:
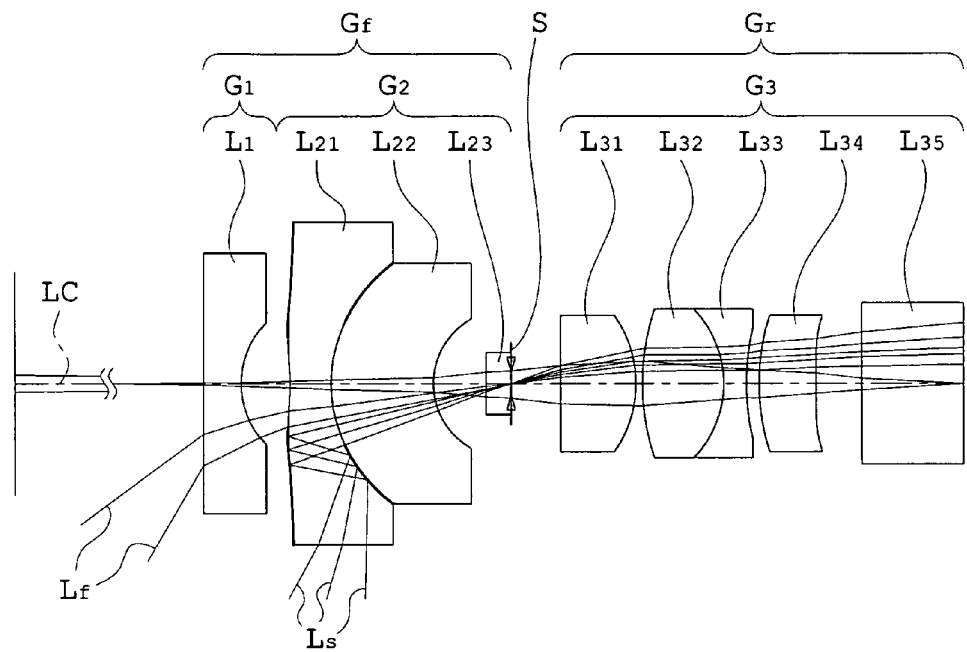
FIGS. 3A and 3B are sectional views of an optical system according to Embodiment 1 adapted such that the observation coverage on the substantially-lateral-direction-object side is oriented rather forwardly, to show lens configuration, paths of rays, and surfaces and surface separations of lenses, of the optical system.
Figure 3B:
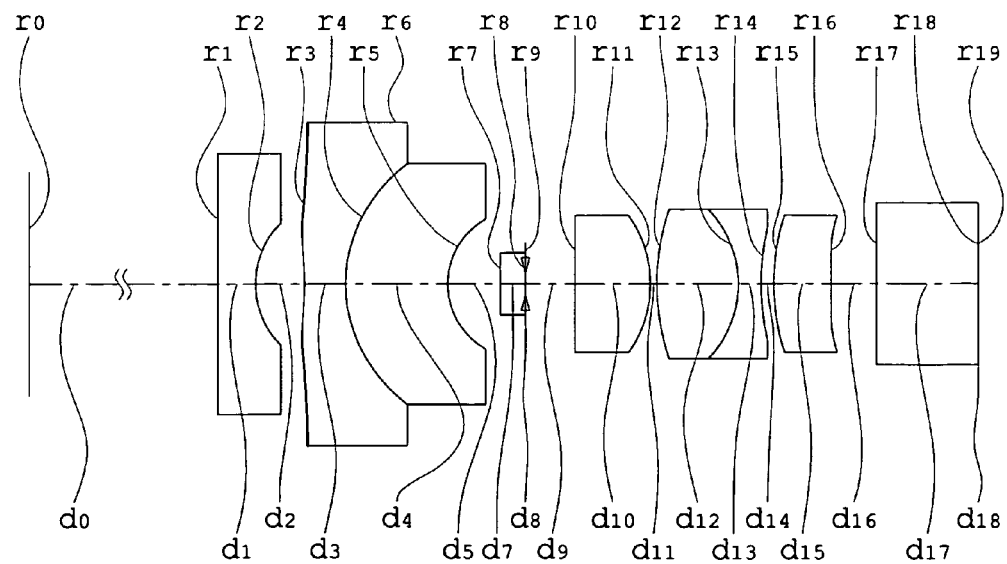

First, the configurations of these two optical systems are explained in reference to FIG. 2 and FIG. 3.

In each of the two optical systems of this embodiment, a front group $G_f$, an aperture stop S and a rear group $G_r$, are arranged on an optical axis LC of light from the front-direction-object side, in order from the front-direction-object side. The front group $G_f$ is composed of a first lens unit $G_1$ and a second lens unit $G_2$ and has a negative refracting power as a whole, while the rear group $G_r$ is composed of a third lens unit $G_3$ and has a positive refracting power as a whole.

The first lens unit $G_1$ is composed of a lens $L_1$ that is a plano-concave lens with the concave surface thereof being directed toward the image side.

The second lens unit $G_2$ includes, in order from the front-direction-object side, a lens $L_{21}$ that is a biconcave lens with the front-direction-object-side surface thereof being aspherical, a lens $L_{22}$ that is a negative meniscus lens with the concave surface thereof being directed toward the image side, and a planar lens $L_{23}$. The image-side surface of the lens $L_{21}$ and the front-direction-object-side surface of the lens $L_{22}$ are cemented together, so that the lens $L_{21}$ and the lens $L_{22}$ constitute a reflecting/refracting optical element. The lens $L_{21}$ and the lens $L_{22}$ are made of an identical glass material.

The aperture stop S is arranged on the image-side surface of the lens $L_{23}$.

The third lens unit $G_3$ includes, in order from the front-direction-object side, a lens $L_{31}$ that is a plano-convex lens with the convex surface thereof being directed toward the image side, a cemented lens component composed of a lens $L_{22}$ that is a biconvex lens and a lens $L_{33}$ that is a biconcave lens, a lens $L_{34}$ that is a biconvex lens with the image-side surface thereof being aspherical, and a lens $L_{35}$ that is a planar lens. The image-side surface of the lens $L_{32}$ and the front-direction-object-side surface of the lens $L_{33}$ are cemented together.

The shapes of the lenses as referred to are those in the neighborhood of the optical axis of light from the front-direction-object side.

Figure 4:
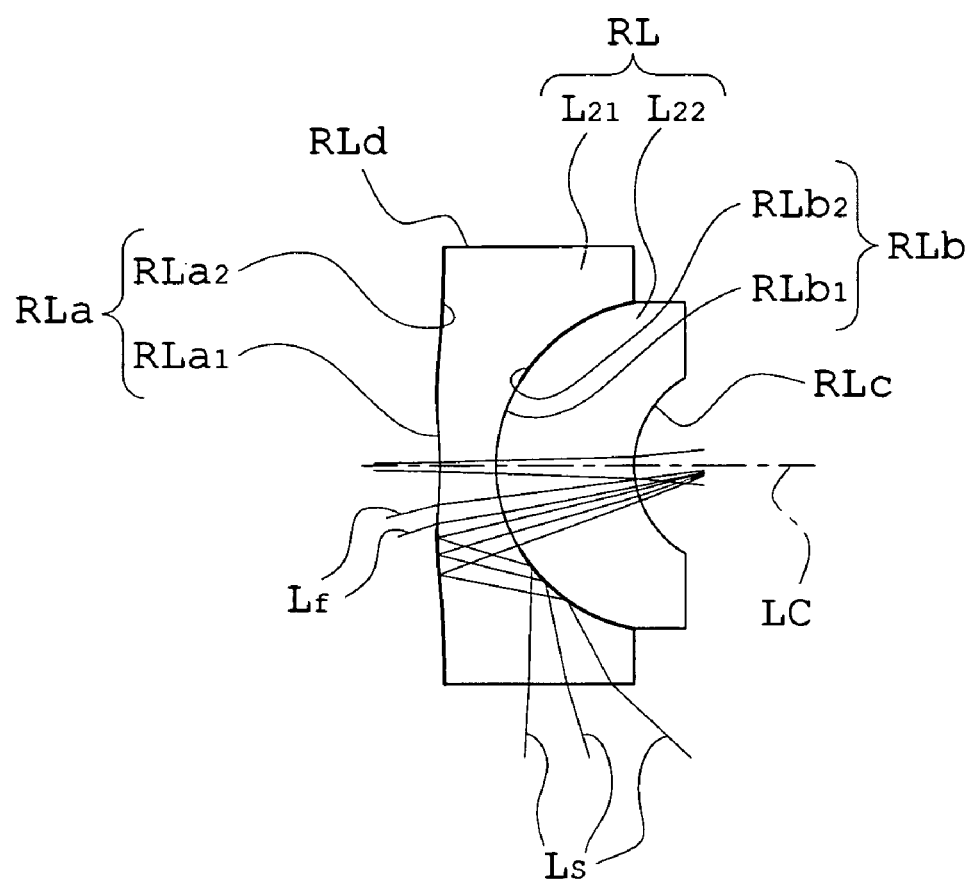
FIG. 4 is an enlarged diagram of a reflecting/refracting optical element included in an optical system according to Embodiment 1.
Figure 5A:
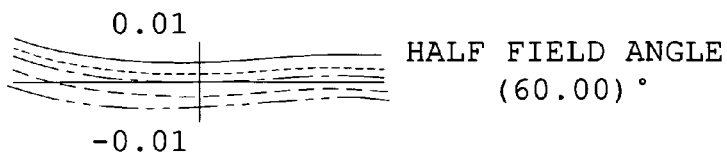
FIGS. 5A-5E and FIGS. 5F-5J are aberration diagrams of the optical system of Embodiment 1 adapted such that the observation coverage on the substantially-lateral-direction-object side is oriented rather backwardly, for rays travelling from the front-direction-object side toward the image pickup surface, specifically showing coma on the meridional plane at the half-field angles of 60°, 55°, 45°, 30° and 0°, and coma on the sagittal plane at the half-field angles of 60°, 55°, 45°, 30° and 0°.
Figure 5B:
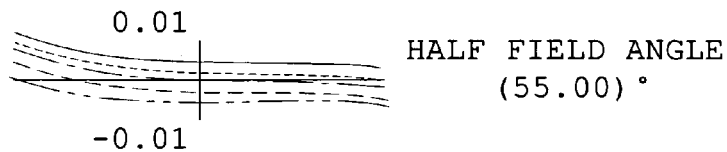
Figure 5C:
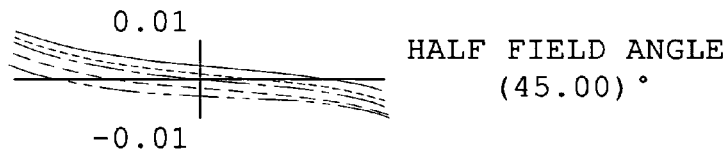
Figure 5D:
Figure 5E:
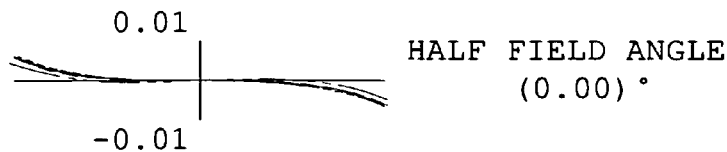
Figure 5F:
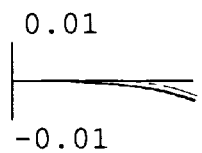
Figure 5G:
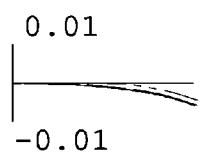
Figure 5H:
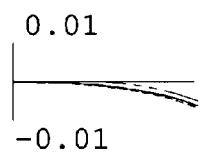
Figure 5I:
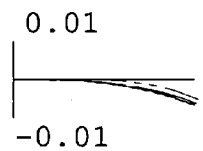
Figure 5J:
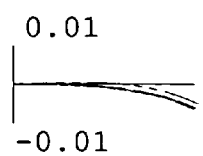
Figure 6A:
FIGS. 6A-6E and FIGS. 6F-6J are aberration diagrams of the optical system of Embodiment 1 adapted such that the observation coverage on the substantially-lateral-direction-object side is oriented rather backwardly, for rays travelling from the substantially-lateral-direction-object side toward the image pickup surface, specifically showing coma on the meridional plane at the half-field angles of 135°, 125°, 115°, 105° and 90°, and coma on the sagittal plane at the half-field angles of 135°, 125°, 115°, 105° and 90°.
Figure 6B:
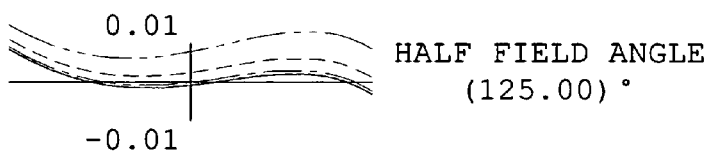
Figure 6C:
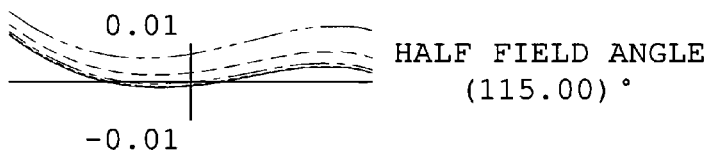
Figure 6D:
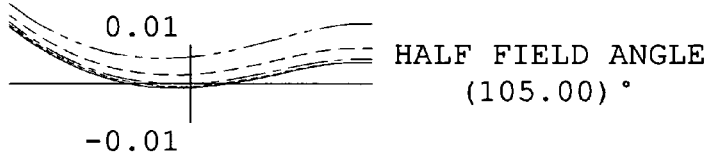
Figure 6E:
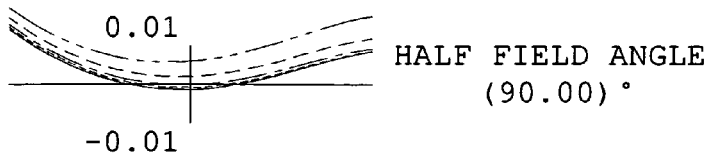
Figure 6F:
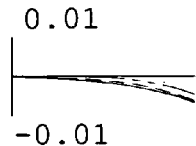
Figure 6G:
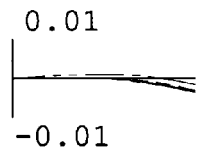
Figure 6H:
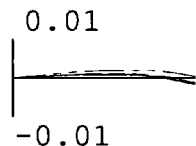
Figure 6I:
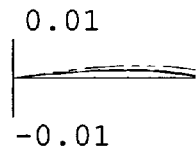
Figure 6J:
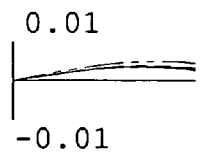
Figure 7A:
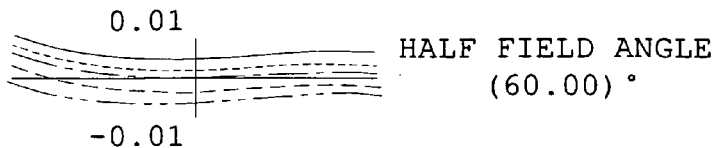
FIGS. 7A-7E and FIGS. 7F-7J are aberration diagrams of the optical system of Embodiment 1 adapted such that the observation coverage on the substantially-lateral-direction-object side is oriented rather forwardly, for rays travelling from the front-direction-object side toward the image pickup surface, specifically showing coma on the meridional plane at the half-field angles of 60°, 55°, 45°, 30° and 0°, and coma on the sagittal plane at the half-field angles of 60°, 55°, 45°, 30° and 0°.
Figure 7B:
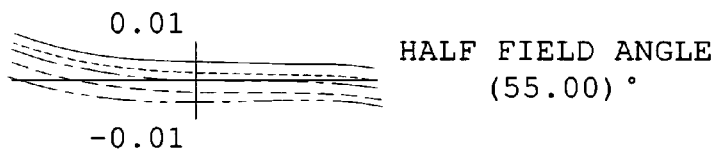
Figure 7C:
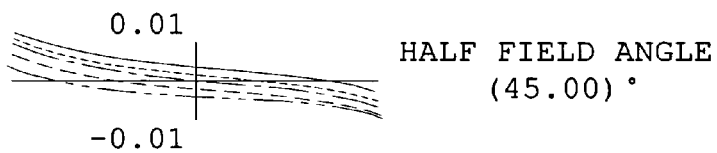
Figure 7D:
Figure 7E:
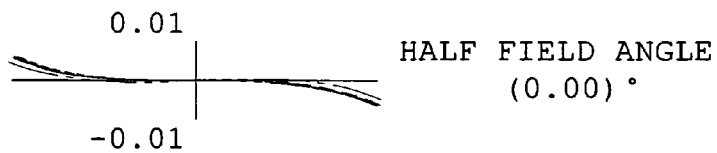
Figure 7F:
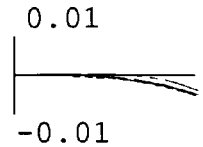
Figure 7G:
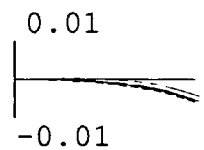
Figure 7H:
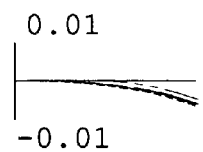
Figure 7I:
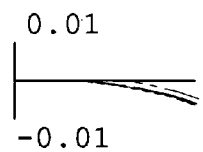
Figure 7J:
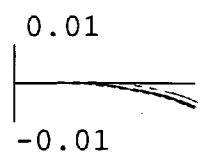
Figure 8A:
FIGS. 8A-8E and FIGS. 8F-8J are aberration diagrams of the optical system of Embodiment 1 adapted such that the observation coverage on the substantially-lateral-direction-object side is oriented rather forwardly, for rays travelling from the substantially-lateral-direction-object side toward the image pickup surface, specifically showing coma on the meridional plane at the half-field angles of 90°, 85°, 80°, 70° and 60°, and coma on the sagittal plane at the half-field angles of 90°, 85°, 80°, 70° and 60°.
Figure 8B:
Figure 8C:
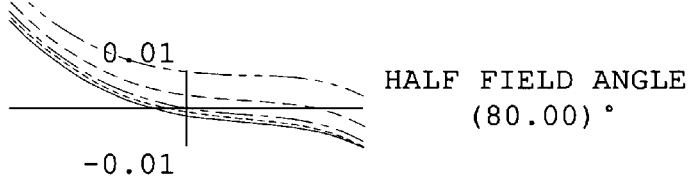
Figure 8D:
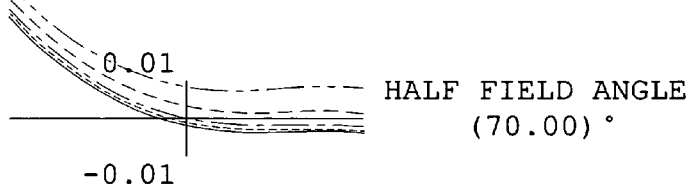
Figure 8E:
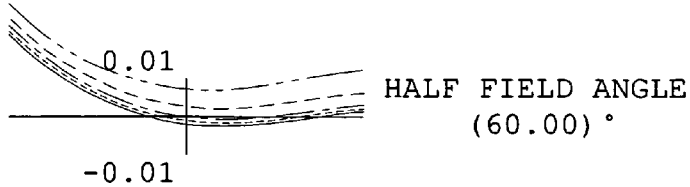
Figure 8F:
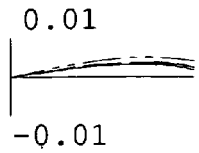
Figure 8G:
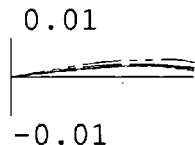
Figure 8H:
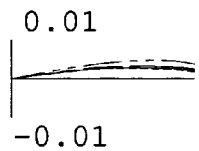
Figure 8I:
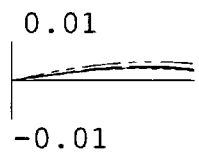
Figure 8J:
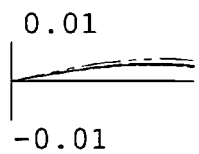

In reference to FIG. 4, detailed explanations are made of the reflecting/refracting optical system provided for simultaneous observation of a front-direction object and a substantially-lateral-direction object.

The reflecting/refracting optical element RL, which is constructed of the lens $L_{21}$ as a first lens and a lens $L_{22}$ as a second lens cemented together, has a first face RLa formed on the front-direction-object side of the first lens, a second face RLb formed on the cemented surface of the lens $L_{21}$ and the lens $L_{22}$, a third face formed on the image side of the lens $L_{22}$, and a fourth face RLd formed on the circumferential face of the lens $L_{21}$.

The first face RLa has a first transmitting surface $RLa_1$ formed with the optical axis being at the center thereof and a first reflecting surface $RLa_2$ directed toward the image side and annularly formed around the first transmitting surface $RLa_1$. The second face RLb has a second transmitting surface $RLb_1$ formed with the optical axis being at the center thereof and a second reflecting surface $RLb_2$ directed toward the front-direction-object side and annularly formed around the second transmitting surface $RLb_1$. The third face RLc is a transmitting surface formed with the optical axis being at the center thereof. The fourth face RLd is formed as a transmitting surface over its entire area.

The first reflecting surface $RLa_2$ and the second reflecting surface $RLb_2$ are made by deposition. To be specific, for example, upon the first transmitting surface $RLa_1$ being masked with a mask having the same contour as the first transmitting surface $RLa_1$, the entire first face RLa is treated with mirror coating and then the mask is removed. By such a method, since the masked portion remains untreated with mirror coating, the first transmitting surface $RLa_1$ can still be used as a transmitting surface even after the first reflecting surface $RLb_2$ is formed.

In reference to FIG. 2 to FIG. 4, explanations are made of paths followed by light entering the two optical systems of this embodiment.

Light $L_f$ entering the optical system of this embodiment from the front-direction-object side first passes the lens $L_1$. Then, the light $L_f$ having passed the lens $L_1$ is incident on the first transmitting surface $RLa_1$ of the reflecting/refracting optical element RL. Then, the light $L_f$ having been incident on the first transmitting surface $RLa_1$ is transmitted through the second transmitting surface $RLb_1$ of the reflecting/refracting optical element RL. Then, the light $L_f$ having being transmitted through the second transmitting surface $RLb_1$ is emergent from the third face RLc of the reflecting/refracting optical element RL. After that, the light $L_f$ having been emergent from the third face RLc passes the lens $L_{23}$, the aperture stop S and the lenses $L_{31}$ through $L_{35}$ in this order, to form an image of the front-direction object at a center position of an observation region on the image surface.

On the other hand, light $L_s$ entering the optical system of this embodiment from the substantially-lateral-direction-object side is first incident on the fourth face RLd of the reflecting/refracting optical element RL. The light $L_s$ having been incident on the fourth face RLd is reflected at the second reflecting surface $RLb_2$ of the reflecting/refracting optical element RL. Then, the light $L_s$ having been reflected at the second reflecting surface $RLb_2$ is reflected at the first reflecting surface $RLa_2$ of the reflecting/refracting optical element RL. Then, the light $L_s$ having been reflected at the first reflecting surface $RLa_2$ is transmitted through the second transmitting surface $RLb_1$ of the reflecting/refracting optical element RL. After that, the light $L_s$ having been transmitted through the second transmitting surface $RLb_1$ is emergent from the third face RLc of the reflective/refractive optical element RL.

Then, the light $L_s$ having been emergent from the third face RLc passes the lens $L_{23}$, the aperture stop S and the lenses $L_{31}$ through $L_{35}$ in this order, to form an image of the substantially-lateral-direction object annularly around the image of the front-direction object that is formed at the center position of the observation region on the image surface.

Numerical data are shown below regarding lenses constituting the optical system shown in FIG. 2, or the optical system adapted such that the observation coverage on the substantially-lateral-direction-object side is oriented rather backwardly, out of the two optical systems according to this embodiment.

| Numerical data 1-1 unit: mm | | | | |
|---|---|---|---|---|
| Surface data | | | | |
| surface number s | radius of curvature r | surface separation d | refractive index nd | Abbe's number vd |
| 0 (object surface) | | 12.3 | | |
| 1 | ∞ | 0.6 | 1.8830 | 40.8 |
| 2 | 1.4 | 0.777 | | |
| 3 (aspherical surface) | −4.39406 | 0.65 | 1.5163 | 64.1 |
| 4 | 1.975 | 1.6 | 1.5163 | 64.1 |
| 5 | 1.20974 | 0.832 | | |
| 6 | 2.5 | | | |
| 7 | ∞ | 0.4 | 1.5163 | 64.1 |
| 8 | ∞ | 0 | | |
| 9 (aperture step) | ∞ | 0.78 | | |
| 10 | ∞ | 1.2 | 1.804 | 46.6 |
| 11 | −1.93 | 0.1 | | |
| 12 | 3.7633 | 1.3 | 1.7292 | 54.7 |
| 13 | −1.75 | 0.35 | 1.8467 | 23.8 |
| 14 | 4.1 | 0.2 | | |
| 15 | 3.71289 | 0.9 | 1.5163 | 64.1 |
| 16 (aspherical surface) | −10.56729 | 0.72 | | |
| 17 | ∞ | 1.6 | 1.5163 | 64.1 |
| 18 | ∞ | 0 | | |
| 19 (image surface) | | | | |

It is noted that the radius of curvature for the surface number 6 is a radius of curvature of the fourth face of the reflecting/refracting optical element RL, that is, the circumferential face around the optical axis LC of the lens $L_{21}$.

| Aspherical data | | | | | | |
|---|---|---|---|---|---|---|
| surface number s | radius of curvature r | conic constant k | aspherical coefficients | | | |
| | | | $A_4$ | $A_6$ | $A_8$ | $A_{10}$ |
| 4 | −4.39406 | 0 | 1.09E−01 | −4.54E−02 | 1.18E−02 | −1.35E−03 |
| 16 | −10.56729 | 0 | 5.64E−03 | 1.88E−01 | −3.60E−02 | −5.60E−02 |

| Various data | |
|---|---|
| F number: | 5.3 |
| focal length (front-direction-object side): | 0.469 |
| entire lens length: | 12.010 mm |
| back focal distance: | 0 mm |
| image height | |
| front-direction-object side: | 0.472 mm |
| substantially-lateral-direction-object side: | 0.978 mm |
| half-field angle | |
| for front-direction-object side: | 60° |
| for substantially-lateral-direction-object side (minimum angle~maximum angle): | 90°~135° |

| Data regarding numerical conditions | | |
|---|---|---|
| Condition (1) | $|n_{d\_RL1} - n_{d\_RL2}| < 0.3$ | 0 |
| Condition (2) | $|v_{d\_RL1} - v_{d\_RL2}| < 40$ | 0 |
| Condition (3) | $1 < |r_c/h| < 1.55$ | 1.211656442 |

Numerical data are shown below regarding lenses constituting the optical system shown in FIG. 3, or the optical system adapted such that the observation coverage on the substantially-lateral-direction-object side is oriented rather forwardly, out of the two optical systems according to this embodiment. Aspherical data and other various data are omitted, for they are identical to those of the optical system adapted such that the observation coverage is oriented rather backwardly.

Numerical data 1-2
unit: mm

Surface data

| surface number s | radius of curvature r | surface separation d | refractive index nd | Abbe's number vd |
|---|---|---|---|---|
| 0 (object surface) | | 12.3 | | |
| 1 | ∞ | 0.6 | 1.8830 | 40.8 |
| 2 | 1.4 | 0.777 | | |
| 3 (aspherical surface) | −4.39406 | 0.65 | 1.5163 | 64.1 |
| 4 | 2.43 | 1.6 | 1.5163 | 64.1 |
| 5 | 1.20974 | 0.832 | | |
| 6 | 2.5 | | | |
| 7 | ∞ | 0.4 | 1.5163 | 64.1 |
| 8 | ∞ | 0 | | |
| 9 (aperture stop) | ∞ | 0.78 | | |
| 10 | ∞ | 1.2 | 1.804 | 46.6 |
| 11 | −1.93 | 0.1 | | |
| 12 | 3.7633 | 1.3 | 1.7292 | 54.7 |
| 13 | −1.75 | 0.35 | 1.8467 | 23.8 |
| 14 | 4.1 | 0.2 | | |
| 15 | 3.71289 | 0.9 | 1.5163 | 64.1 |
| 16 (aspherical surface) | −10.56729 | 0.72 | | |
| 17 | ∞ | 1.6 | 1.5163 | 64.1 |
| 18 | ∞ | 0 | | |
| 19 (image surface) | | | | |

The radius of curvature for the surface number 6 is a radius of curvature of the fourth face of the reflecting/refracting optical element RL, that is, the circumferential face around the optical axis LC of the lens $L_{21}$.

Various data
half-field angle

| for front-direction-object side: | 60° |
|---|---|
| for substantially-lateral-direction-object side (minimum angle~maximum angle): | 55°~90° |

Data regarding numerical conditions

| Condition (1) | $|n_{d\_RL1} - n_{d\_RL2}| < 0.3$ | 0 |
| Condition (2) | $|v_{d\_RL1} - v_{d\_RL2}| < 40$ | 0 |
| Condition (3) | $1 < |r_c/h| < 1.55$ | 1.51875 |

As shown above, these two optical systems of this embodiment differ only in radius of curvature of the cemented surface (the second face) of two lenses constituting the reflecting/refracting optical element. That is, the lenses other than the reflecting/refracting optical element can be commonly used.

In addition, since the two lenses constituting the reflecting/refracting optical element are made of an identical glass material, these optical systems, while differing in radius of curvature of the second face of the reflecting/refracting optical element, achieve substantially the same imaging performance for light entering them on the front-direction-object side.

Therefore, in manufacturing these two models of optical systems of this embodiment, only the reflecting/refracting optical elements of these models have to be individually manufactured, and thus the production cost can be reduced.

Embodiment 2

In reference to FIG. 9 through FIG. 14, detailed explanations are made of two optical systems according to Embodiment 2, to be specific, optical systems that make it possible to achieve simultaneous observation of a front-direction object and a substantially-lateral-direction object, one being configured so that the observation coverage on the substantially-lateral-direction-object side is oriented rather backwardly and another being configured so that the observation coverage on the substantially-lateral-direction-object side is shifted to be oriented rather forwardly only by a change in configuration of the reflecting/refracting optical system from the former optical system. These two optical systems of this embodiment are different from the two optical systems of Embodiment 1 only in shapes and characteristics of two lenses constituting the reflecting/refracting optical element and in surface separations of lenses constituting the optical systems, while other features such as paths followed by light entering the optical systems are substantially the same as those of the optical systems of Embodiment 1. Thus, members having substantially same configurations are labeled with same symbols and detailed explanations on these are omitted.

Figure 9A:
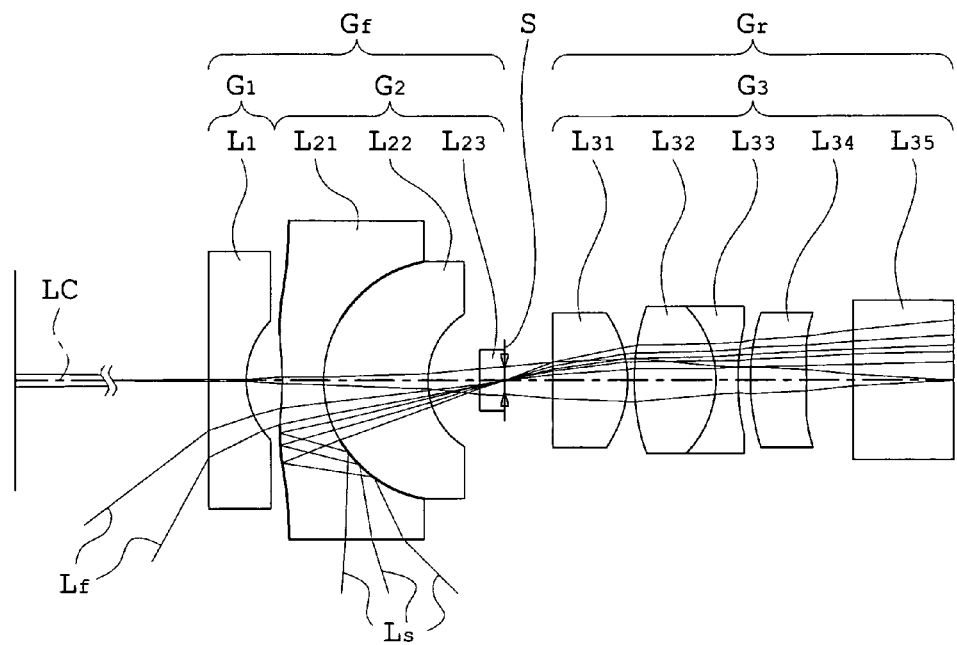
FIGS. 9A and 9B are sectional views of an optical system according to Embodiment 2 adapted such that the observation coverage on the substantially-lateral-direction-object side is oriented rather backwardly, to show lens configuration, paths of rays, and surfaces and surface separations of lenses, of the optical system.
Figure 9B:
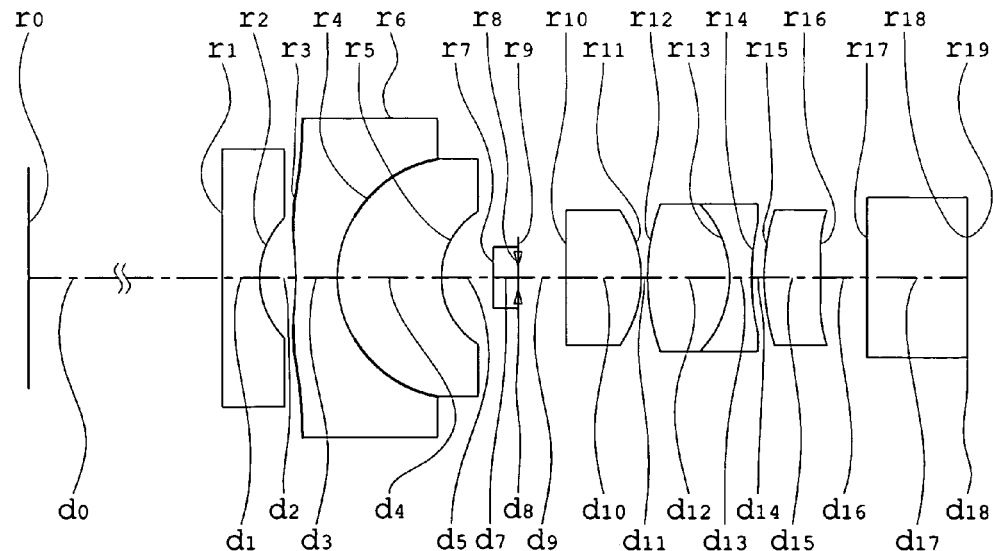
Figure 10A:
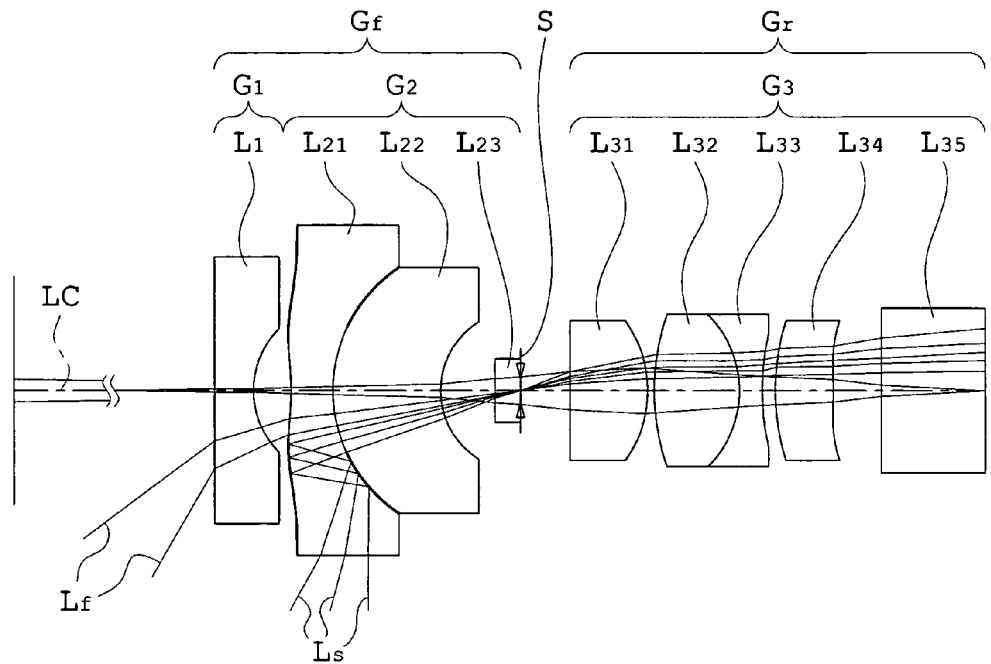
FIGS. 10A and 10B are sectional views of an optical system according to Embodiment 2 adapted such that the observation coverage on the substantially-lateral-direction-object side is oriented rather forwardly, to show lens configuration, paths of rays, and surfaces and surface separations of lenses, of the optical system.
Figure 10B:
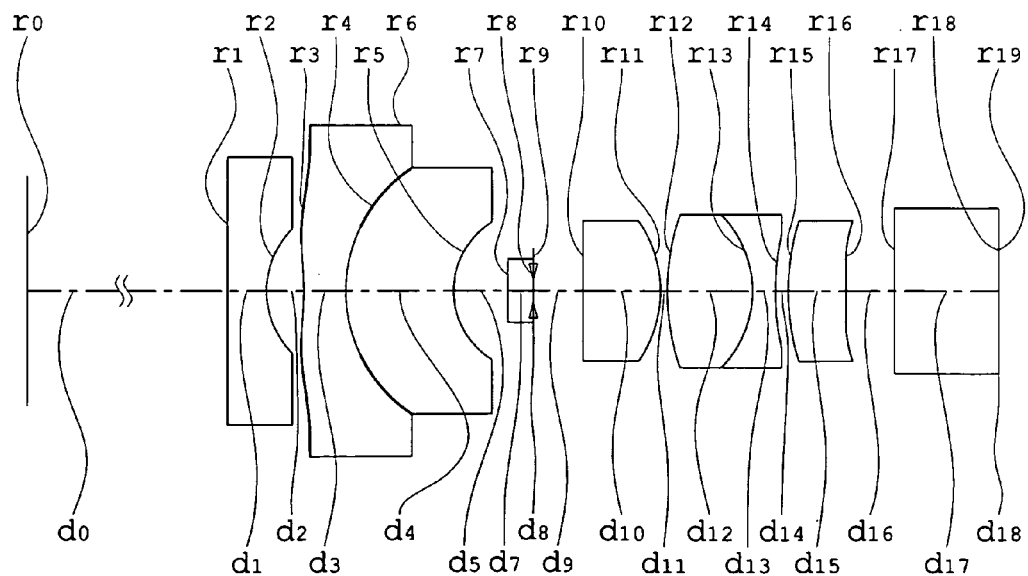
Figure 11A:
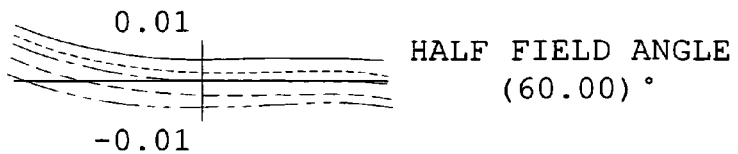
FIGS. 11A-11E and FIGS. 11F-11J are aberration diagrams of the optical system of Embodiment 2 adapted such that the observation coverage on the substantially-lateral-direction-object side is oriented rather backwardly, for rays travelling from the front-direction-object side toward the image pickup surface, specifically showing coma on the meridional plane at the half-field angles of 60°, 55°, 45°, 30° and 0°, and coma on the sagittal plane at the half-field angles of 60°, 55°, 45°, 30° and 0°
Figure 11B:
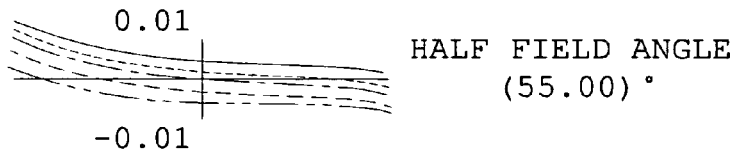
Figure 11C:
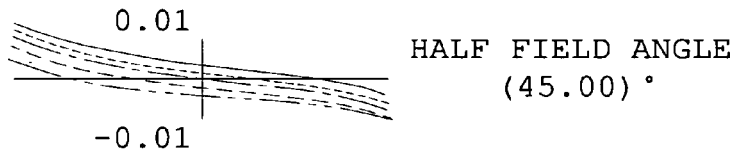
Figure 11D:
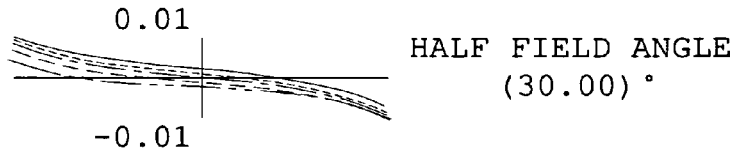
Figure 11E:
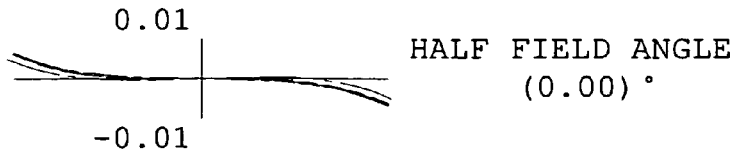
Figure 11F:
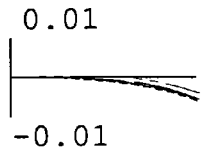
Figure 11G:
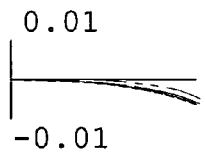
Figure 11H:
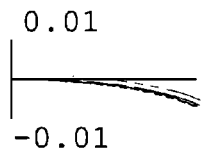
Figure 11I:
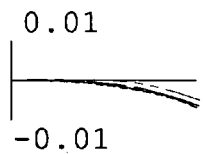
Figure 11J:
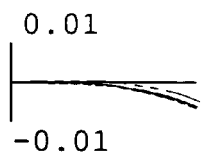
Figure 12A:
FIGS. 12A-12E and FIGS. 12F-12J are aberration diagrams of the optical system of Embodiment 2 adapted such that the observation coverage on the substantially-lateral-direction-object side is oriented rather backwardly, for rays travelling from the substantially-lateral-direction-object side toward the image pickup surface, specifically showing coma on the meridional plane at the half-field angles of 135°, 125°, 115°, 105° and 90°, and coma on the sagittal plane at the half-field angles of 135°, 125°, 115°, 105° and 90°.
Figure 12B:
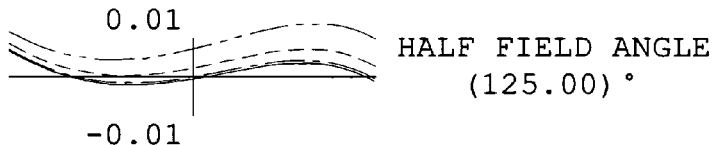
Figure 12C:
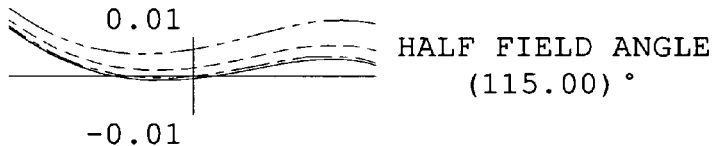
Figure 12D:
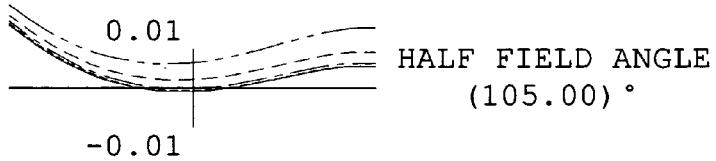
Figure 12E:
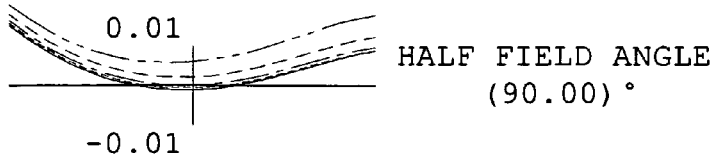
Figure 12F:
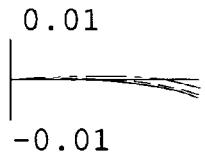
Figure 12G:
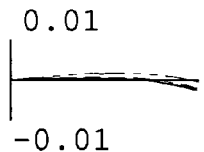
Figure 12H:
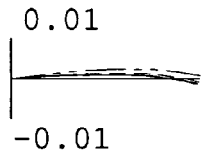
Figure 12I:
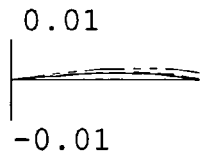
Figure 12J:
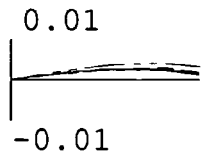
Figure 13A:
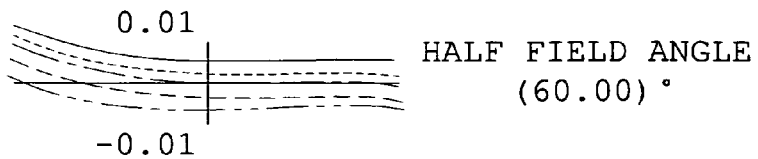
FIGS. 13A-13E and FIGS. 13F-13J are aberration diagrams of the optical system of Embodiment 2 adapted such that the observation coverage on the substantially-lateral-direction-object side is oriented rather forwardly, for rays travelling from the front-direction-object side toward the image pickup surface, specifically showing coma on the meridional plane at the half-field angles of 60°, 55°, 45°, 30° and 0°, and coma on the sagittal plane at the half-field angles of 60°, 55°, 45°, 30° and 0°.
Figure 13B:
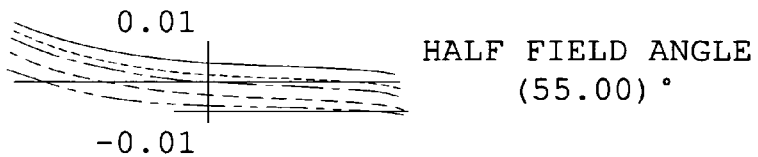
Figure 13C:
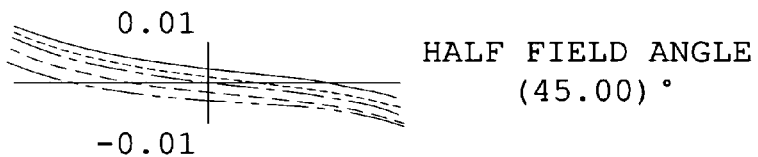
Figure 13D:
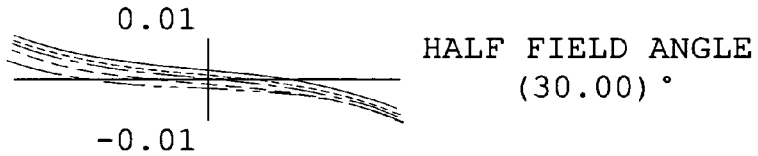
Figure 13E:
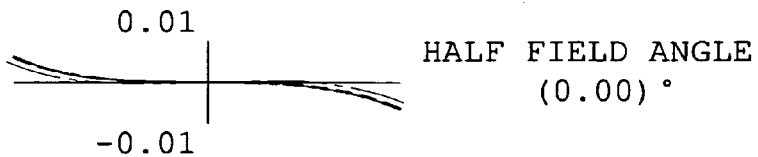
Figure 13F:
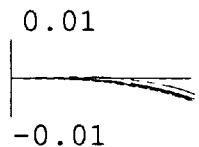
Figure 13G:
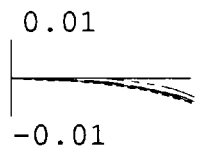
Figure 13H:
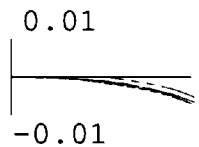
Figure 13I:
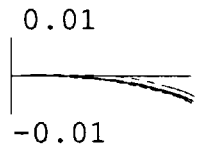
Figure 13J:
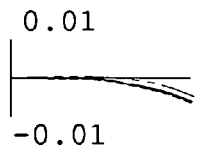
Figure 14A:
FIGS. 14A-14E and FIGS. 14F-14J are aberration diagrams of the optical system of Embodiment 2 adapted such that the observation coverage on the substantially-lateral-direction-object side is oriented rather forwardly, for rays travelling from the substantially-lateral-direction-object side toward the image pickup surface, specifically showing coma on the meridional plane at the half-field angles of 90°, 85°, 80°, 70° and 60°, and coma on the sagittal plane at the half-field angles of 90°, 85°, 80°, 70° and 60°.
Figure 14B:
Figure 14C:
Figure 14D:
Figure 14E:
Figure 14F:
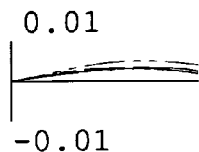
Figure 14G:
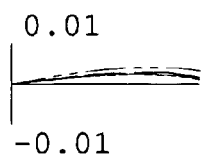
Figure 14H:
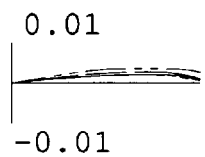
Figure 14I:
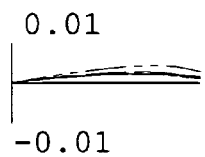
Figure 14J:
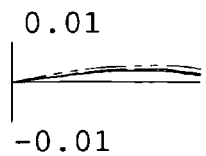

First, the configurations of the two optical systems of this embodiment are explained in reference to FIG. 9 and FIG. 10.

In each of the two optical systems of this embodiment, as in the optical systems of Embodiment 1, the second lens unit $G_2$ includes, in order from the front-direction-object side, a lens $L_{21}$ that is a biconcave lens with the front-direction-object-side surface thereof being aspherical, a lens $L_{22}$ that is a negative meniscus lens with the concave surface thereof being directed toward the image side, and a planar lens $L_{23}$. The configuration is similar also in that the image-side surface of the lens $L_{21}$ and the front-direction-object-side surface of the lens $L_{22}$ are cemented together, so that the lens $L_{21}$ and the lens $L_{22}$ constitute a reflecting/refracting optical element. However, not like the two optical systems of Embodiment 1, the lens $L_{21}$ and the lens $L_{22}$ are made of glass materials having different optical characteristics.

Numerical data are shown below regarding lenses constituting the optical system shown in FIG. 9, or the optical system adapted such that the observation coverage on the substantially-lateral-direction-object side is oriented rather backwardly, out of the two optical systems according to this embodiment.

Numerical data 2-1
unit: mm

Surface data

| surface number s | radius of curvature r | surface separation d | refractive index nd | Abbe's number νd |
|---|---|---|---|---|
| 0 (object surface) | | 11.46 | | |
| 1 | ∞ | 0.6 | 1.8830 | 40.8 |
| 2 | 1.4 | 0.58115 | | |
| 3 (aspherical surface) | −4.57279 | 0.65 | 1.651597 | 58.5 |
| 4 | 1.97 | 1.659967 | 1.5163 | 64.1 |
| 5 | 1.29332 | 0.833459 | | |
| 6 | 2.5 | | | |
| 7 | ∞ | 0.4 | 1.5163 | 64.1 |
| 8 | ∞ | 0 | | |
| 9 (aperture stop) | ∞ | 0.78 | | |
| 10 | ∞ | 1.2 | 1.804 | 46.6 |
| 11 | −1.93 | 0.1 | | |
| 12 | 3.7633 | 1.3 | 1.7292 | 54.7 |
| 13 | −1.75 | 0.35 | 1.8467 | 23.8 |
| 14 | 4.1 | 0.2 | | |
| 15 | 3.71289 | 0.9 | 1.5163 | 64.1 |
| 16 (aperture stop) | −10.56729 | 0.746235 | | |
| 17 | ∞ | 1.6 | 1.5163 | 64.1 |
| 18 | ∞ | 0 | | |
| 19 (image surface) | | | | |

The radius of curvature for the surface number 6 is a radius of curvature of the fourth face of the reflecting/refracting optical element RL, that is, the circumferential face around the optical axis LC of the lens $L_{21}$.

Aspherical data

| surface number s | radius of curvature r | conic constant k | $A_4$ | $A_6$ | $A_8$ | $A_{10}$ |
|---|---|---|---|---|---|---|
| 4 | −4.57279 | 0 | 1.03E−01 | −4.00E−02 | 9.59E−03 | −1.01E−03 |
| 16 | −10.56729 | 0 | 5.64E−03 | 1.88E−01 | −3.60E−02 | −5.60E−02 |

Various data

| F number: | 5.3 |
|---|---|
| focal length (front-direction-object side): | 0.461 |
| entire lens length: | 11.901 mm |
| back focal distance: | 0 mm | image height

| front-direction-object side: | 0.472 mm |
|---|---|
| substantially-lateral-direction-object side: | 0.978 mm | half-field angle

| for front-direction-object side: | 60° |
|---|---|
| for substantially-lateral-direction-object side (minimum angle~maximum angle): | 90°~135° |

Data regarding numerical conditions

| Condition (1) | $|n_{d\_RL1} - n_{d\_RL2}| < 0.3$ | 0.1353 |
|---|---|---|
| Condition (2) | $|\nu_{d\_RL1} - \nu_{d\_RL2}| < 40$ | 5.6 |
| Condition (3) | $1 < |r_c/h| < 1.55$ | 1.223602484 |

Numerical data are shown below regarding lenses constituting the optical system shown in FIG. 10, or the optical system adapted such that the observation coverage on the substantially-lateral-direction-object side is oriented rather forwardly, out of the two optical systems according to this embodiment. Aspherical data and other various data are omitted, for they are identical to those of the optical system adapted such that the observation coverage is oriented rather backwardly.

Numerical data 2-2
unit: mm

Surface data

| surface number s | radius of curvature r | surface separation d | refractive index nd | Abbe's number vd |
|---|---|---|---|---|
| 0 (object surface) | | 11.46 | | |
| 1 | ∞ | 0.6 | 1.8830 | 40.8 |
| 2 | 1.4 | 0.58115 | | |
| 3 (aspherical surface) | −4.57279 | 0.65 | 1.651597 | 58.5 |
| 4 | 2.35 | 1.659967 | 1.5163 | 64.1 |
| 5 | 1.29332 | 0.833459 | | |
| 6 | 2.5 | | | |
| 7 | ∞ | 0.4 | 1.5163 | 64.1 |
| 8 | ∞ | 0 | | |
| 9 (aperture stop) | ∞ | 0.78 | | |
| 10 | ∞ | 1.2 | 1.804 | 46.6 |
| 11 | −1.93 | 0.1 | | |
| 12 | 3.7633 | 1.3 | 1.7292 | 54.7 |
| 13 | −1.75 | 0.35 | 1.8467 | 23.8 |
| 14 | 4.1 | 0.2 | | |
| 15 | 3.71289 | 0.9 | 1.5163 | 64.1 |
| 16 (aspherical surface) | −10.56729 | 0.746235 | | |
| 17 | ∞ | 1.6 | 1.5163 | 64.1 |
| 18 | ∞ | 0 | | |
| 19 (image surface) | | | | |

The radius of curvature for the surface number 6 is a radius of curvature of the fourth face of the reflecting/refracting optical element RL, that is, the circumferential face around the optical axis LC of the lens $L_{21}$.

Various data
half-field angle

| for front-direction-object side: | 60° |
|---|---|
| for substantially-lateral-direction-object side (minimum angle~maximum angle): | 55°~90° |

Data regarding numerical conditions

| Condition (1) | $|n_{d\_RL1} - n_{d\_RL2}| < 0.3$ | 0.1353 |
| Condition (2) | $|v_{d\_RL1} - v_{d\_RL2}| < 40$ | 5.6 |
| Condition (3) | $1 < |r_c/h| < 1.55$ | 1.496815287 |

As shown above, not like the two optical systems of Embodiment 1, the two lenses constituting the reflecting/refracting optical element have different optical properties in each of the two optical systems of this embodiment. However, since the differences in optical characteristics are within ranges as satisfying Conditions (1) and (2), substantially the same function and effect can be achieved as by the two optical systems of Embodiment 1.

Embodiment 3

In reference to FIG. 15 through FIG. 20, detailed explanations are made of two optical systems according to Embodiment 3, to be specific, optical systems that make it possible to achieve simultaneous observation of a front-direction object and a substantially-lateral-direction object, one being configured so that the observation coverage on the substantially-lateral-direction-object side is oriented rather backwardly and another being configured so that the observation coverage on the substantially-lateral-direction-object side is shifted to be oriented rather forwardly only by a change in configuration of the reflecting/refracting optical system from the former optical system. These two optical systems of this embodiment are different from the two optical systems of each of Embodiments 1 and 2 only in shapes and characteristics of two lenses constituting the reflecting/refracting optical element and in surface separations of lenses constituting the optical systems, while other features such as paths followed by light entering the optical systems are substantially the same as those of the optical systems of Embodiments 1 and 2. Thus, members having substantially same configurations are labeled with same symbols and detailed explanations on these are omitted.

Figure 15A:
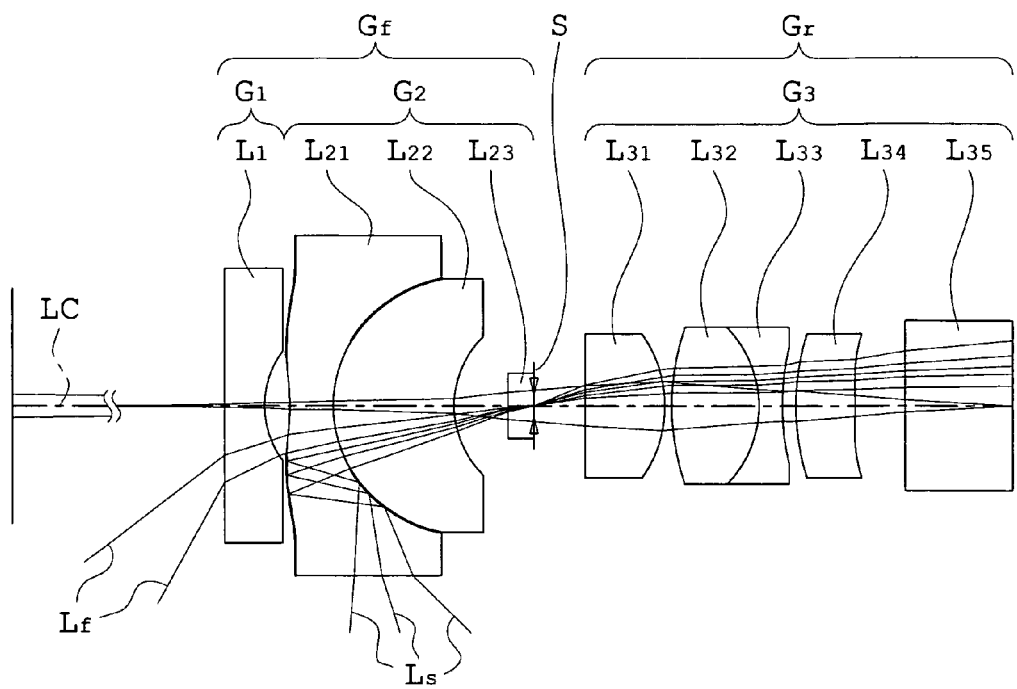
FIGS. 15A and 15B are sectional views of an optical system according to Embodiment 3 adapted such that the observation coverage on the substantially-lateral-direction-object side is oriented rather backwardly, to show lens configuration, paths of rays, and surfaces and surface separations of lenses, of the optical system.
Figure 15B:
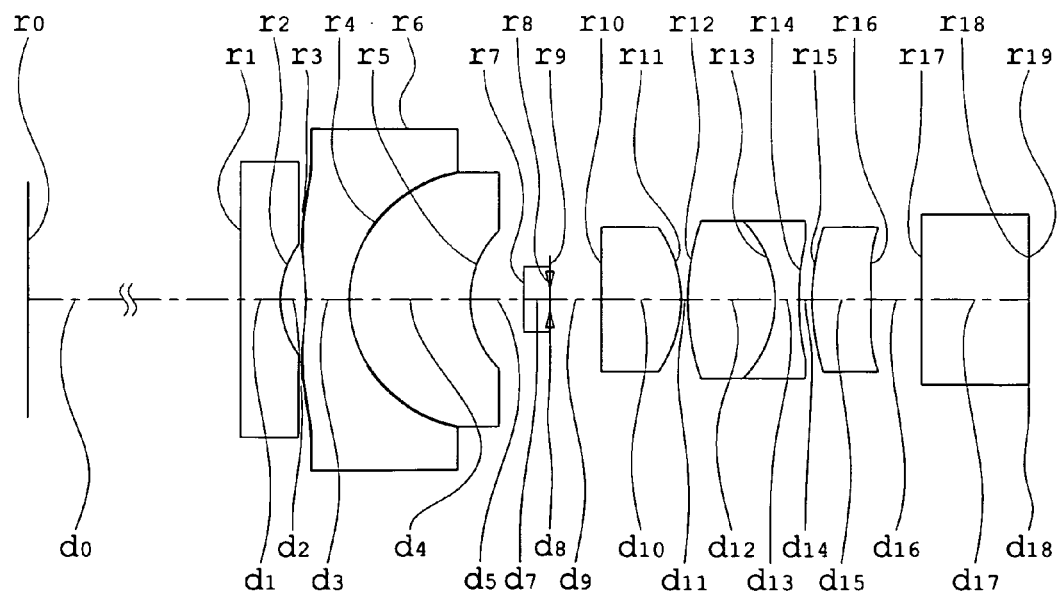
Figure 16A:
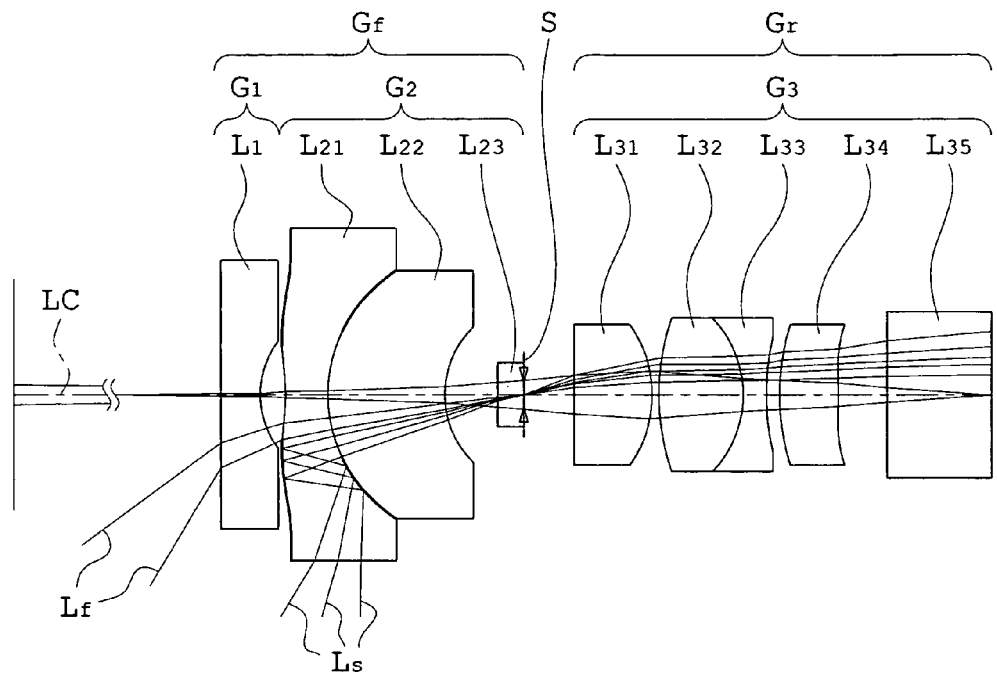
FIGS. 16A and 16B are sectional views of an optical system according to Embodiment 3 adapted such that the observation coverage on the substantially-lateral-direction-object side is oriented rather forwardly, to show lens configuration, paths of rays, and surfaces and surface separations of lenses, of the optical system.
Figure 16B:
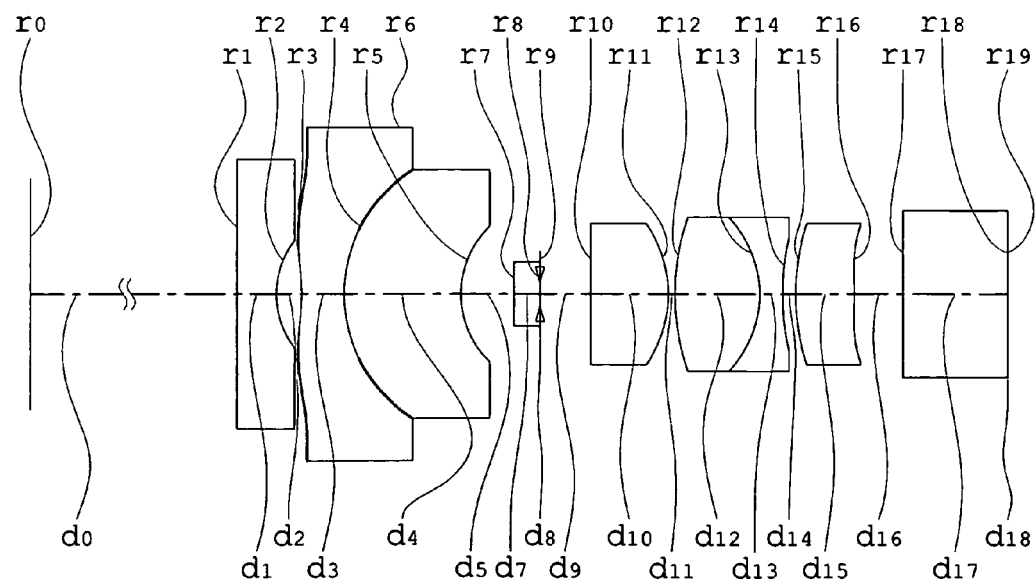
Figure 17A:
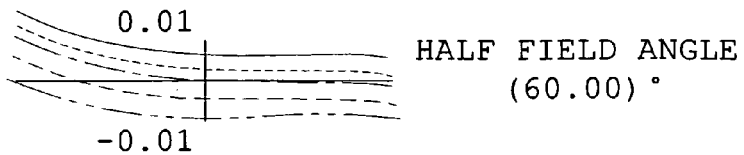
FIGS. 17A-17E and FIGS. 17F-17J are aberration diagrams of the optical system of Embodiment 3 adapted such that the observation coverage on the substantially-lateral-direction-object side is oriented rather backwardly, for rays travelling from the front-direction-object side toward the image pickup surface, specifically showing coma on the meridional plane at the half-field angles of 60°, 55°, 45°, 30° and 0°, and coma on the sagittal plane at the half-field angles of 60°, 55°, 45°, 30° and 0°.
Figure 17B:
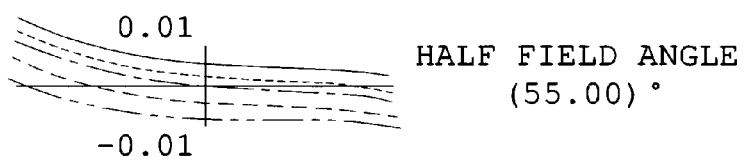
Figure 17C:
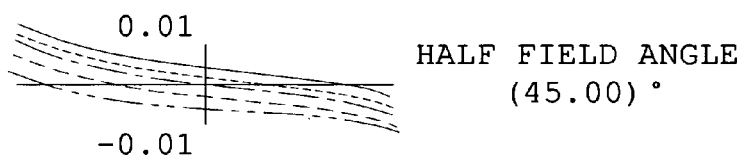
Figure 17D:
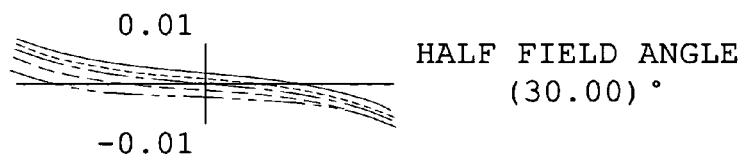
Figure 17E:
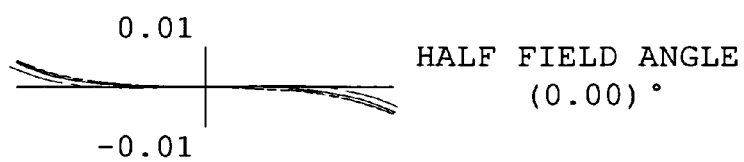
Figure 17F:
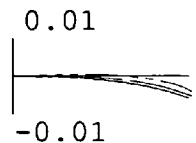
Figure 17G:
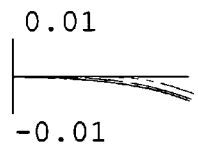
Figure 17H:
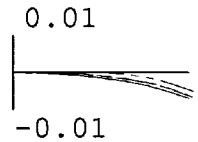
Figure 17I:
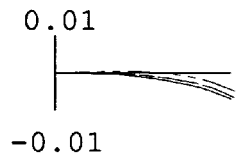
Figure 17J:
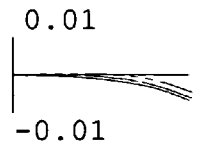
Figure 18A:
FIGS. 18A-18E and FIGS. 18F-18J are aberration diagrams of the optical system of Embodiment 3 adapted such that the observation coverage on the substantially-lateral-direction-object side is oriented rather backwardly, for rays travelling from the substantially-lateral-direction-object side toward the image pickup surface, specifically showing coma on the meridional plane at the half-field angles of 135°, 125°, 115°, 105° and 90°, and coma on the sagittal plane at the half-field angles of 135°, 125°, 115°, 105° and 90°.
Figure 18B:
Figure 18C:
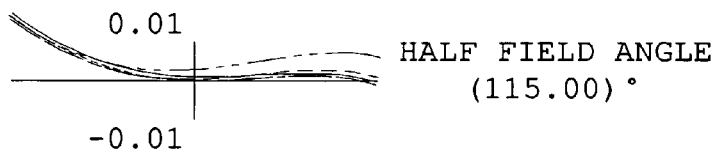
Figure 18D:
Figure 18E:
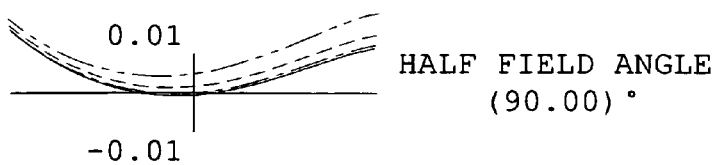
Figure 18F:
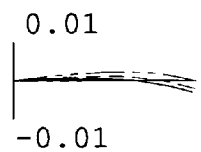
Figure 18G:
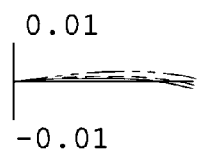
Figure 18H:
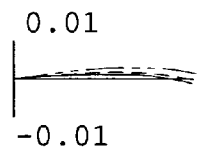
Figure 18I:
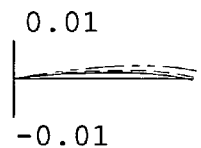
Figure 18J:
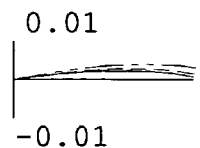
Figure 19A:
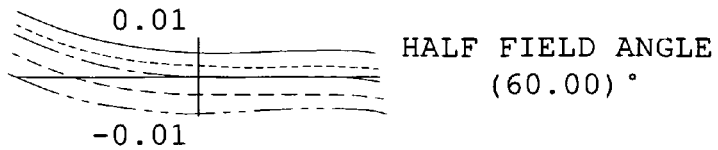
FIGS. 19A-19E and FIGS. 19F-19J are aberration diagrams of the optical system of Embodiment 3 adapted such that the observation coverage on the substantially-lateral-direction-object side is oriented rather forwardly, for rays travelling from the front-direction-object side toward the image pickup surface, specifically showing coma on the meridional plane at the half-field angles of 60°, 55°, 45°, 30° and 0°, and coma on the sagittal plane at the half-field angles of 60°, 55°, 45°, 30° and 0°.
Figure 19B:
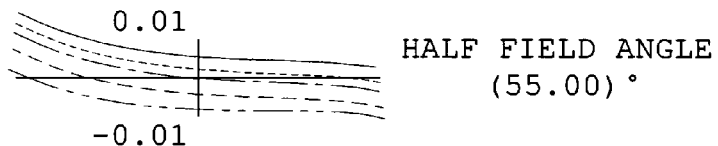
Figure 19C:
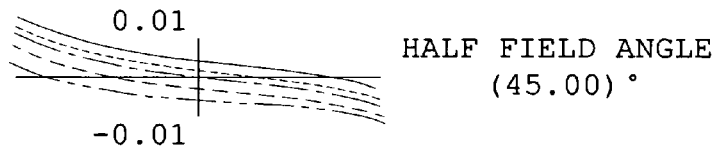
Figure 19D:
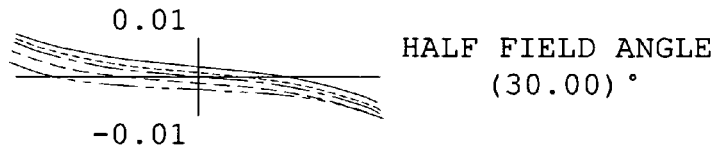
Figure 19E:
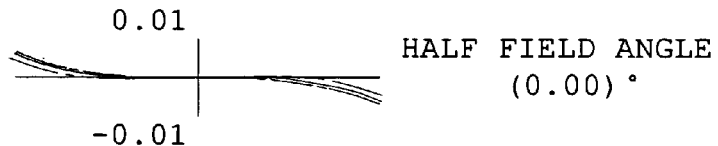
Figure 19F:
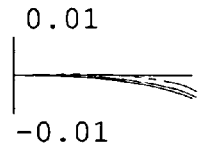
Figure 19G:
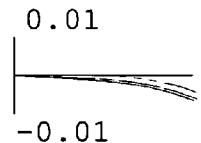
Figure 19H:
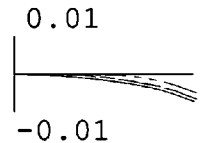
Figure 19I:
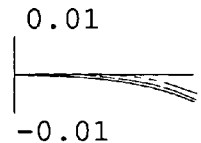
Figure 19J:
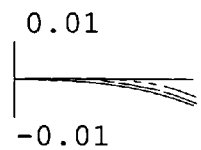
Figure 20A:
FIGS. 20A-20E and FIGS. 20E-20J are aberration diagrams of the optical system of Embodiment 3 adapted such that the observation coverage on the substantially-lateral-direction-object side is oriented rather forwardly, for rays travelling from the substantially-lateral-direction-object side toward the image pickup surface, specifically showing coma on the meridional plane at the half-field angles of 90°, 85°, 80°, 70° and 60°, and coma on the sagittal plane at the half-field angles of 90°, 85°, 80°, 70° and 60°.
Figure 20B:
Figure 20C:
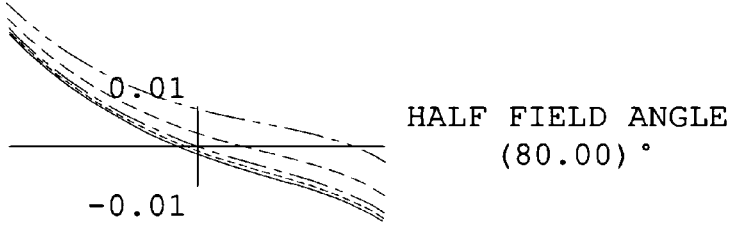
Figure 20D:
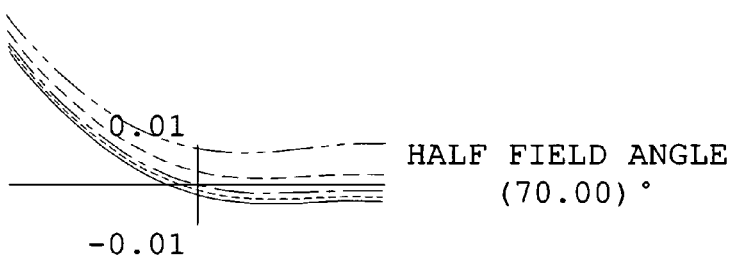
Figure 20E:
Figure 20F:
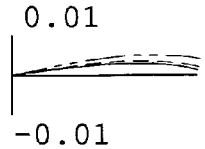
Figure 20G:
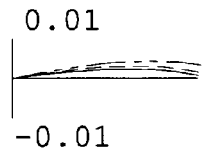
Figure 20H:
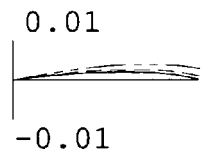
Figure 20I:
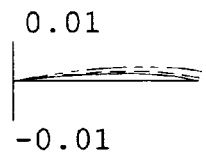
Figure 20J:
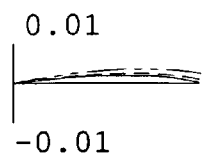

First, the configurations of the two optical systems of this embodiment are explained in reference to FIG. 15 and FIG. 16.

In each of the two optical systems of this embodiment, as in the two optical systems of each of Embodiments 1 and 2, the second lens unit $G_2$ includes, in order from the front-direction-object side, a lens $L_{21}$ that is a biconcave lens with the front-direction-object-side surface thereof being aspherical, a lens $L_{22}$ that is a negative meniscus lens with the concave surface thereof being directed toward the image side, and a planar lens $L_{23}$. The configuration is similar also in that the image-side surface of the lens $L_{21}$ and the front-direction-object-side surface of the lens $L_{22}$ are cemented together, so that the lens $L_{21}$ and the lens $L_{22}$ constitute a reflecting/refracting optical element. However, not like the two optical systems of Embodiment 1 but similar to the two optical systems of Embodiment 2, the lens $L_{21}$ and the lens $L_{22}$ are made of glass materials having different optical characteristics.

Numerical data are shown below regarding lenses constituting the optical system shown in FIG. 15, or the optical system adapted such that the observation coverage on the substantially-lateral-direction-object side is oriented rather backwardly, out of the two optical systems according to this embodiment.

Numerical data 3-1
unit: mm

Surface data

| surface number s | radius of curvature r | surface separation d | refractive index nd | Abbe's number vd |
|---|---|---|---|---|
| 0 (object surface) | | 11.01 | | |
| 1 | ∞ | 0.6 | 1.8830 | 40.8 |
| 2 | 1.4 | 0.393644 | | |
| 3 (aspherical surface) | −5.15879 | 0.65 | 1.800999 | 35.0 |

-continued

Numerical data 3-1
unit: mm

| | | | | |
|---|---|---|---|---|
| 4 | 1.975 | 1.782838 | 1.5163 | 64.1 |
| 5 | 1.50009 | 0.809007 | | |
| 6 | 2.5 | | | |
| 7 | ∞ | 0.4 | 1.5163 | 64.1 |
| 8 | ∞ | 0 | | |
| 9 (aperture stop) | ∞ | 0.78 | | |
| 10 | ∞ | 1.2 | 1.804 | 46.6 |
| 11 | −1.93 | 0.1 | | |
| 12 | 3.7633 | 1.3 | 1.7292 | 54.7 |
| 13 | −1.75 | 0.35 | 1.8467 | 23.8 |
| 14 | 4.1 | 0.2 | | |
| 15 | 3.71289 | 0.9 | 1.5163 | 64.1 |
| 16 (aperture stop) | −10.56729 | 0.746235 | | |
| 17 | ∞ | 1.6 | 1.5163 | 64.1 |
| 18 | ∞ | 0 | | |
| 19 (image surface) | | | | |

The radius of curvature for the surface number 6 is a radius of curvature of the fourth face of the reflecting/refracting optical element RL, that is, the circumferential face around the optical axis LC of the lens $L_{21}$.

Aspherical data

| surface number s | radius of curvature r | conic constant k | aspherical coefficients $A_4$ | $A_6$ | $A_8$ | $A_{10}$ |
|---|---|---|---|---|---|---|
| 4 | −5.15879 | 0 | 7.93E−02 | −2.05E−02 | 2.20E−02 | 4.76E−05 |
| 16 | −10.56729 | 0 | 5.64E−03 | 1.88E−01 | −3.60E−02 | −5.60E−02 |

Various data

| | |
|---|---|
| F number: | 5.3 |
| focal length (front-direction-object side): | 0.463 |
| entire lens length: | 11.795 mm |
| back focal distance: | 0 mm | image height

| | |
|---|---|
| front-direction-object side: | 0.472 mm |
| substantially-lateral-direction-object side: | 0.978 | half-field angle

| | |
|---|---|
| for front-direction-object side: | 60° |
| for substantially-lateral-direction-object side (minimum angle~maximum angle): | 90°~135° |

Data regarding numerical conditions

| | | |
|---|---|---|
| Condition (1) | $\|n_{d\_RL1} - n_{d\_RL2}\| < 0.3$ | 0.2847 |
| Condition (2) | $\|v_{d\_RL1} - v_{d\_RL2}\| < 40$ | 29.1 |
| Condition (3) | $1 < \|r_c/h\| < 1.55$ | 1.234375 |

Numerical data are shown below regarding lenses constituting the optical system shown in FIG. 16, or the optical system adapted such that the observation coverage on the substantially-lateral-direction-object side is oriented rather forwardly, out of the two optical systems according to this embodiment. Aspherical data and other various data are omitted, for they are identical to those of the optical system adapted such that the observation coverage is oriented rather backwardly.

Numerical data 3-2
unit: mm

Surface data

| surface number s | radius of curvature r | surface separation d | refractive index nd | Abbe's number vd |
|---|---|---|---|---|
| 0 (object surface) | | 11.01 | | |
| 1 | ∞ | 0.6 | 1.8830 | 40.8 |

-continued

Numerical data 3-2
unit: mm

| | | | | |
|---|---|---|---|---|
| 2 | 1.4 | 0.393644 | | |
| 3 (aspherical surface) | −5.15879 | 0.65 | 1.800999 | 35.0 |
| 4 | 2.32 | 1.782838 | 1.5163 | 64.1 |
| 5 | 1.50009 | 0.809007 | | |
| 6 | 2.5 | 2.5 | | |
| 7 | ∞ | 0.4 | 1.5163 | 64.1 |
| 8 | ∞ | 0 | | |
| 9 (aperture stop) | ∞ | 0.78 | | |
| 10 | ∞ | 1.2 | 1.804 | 46.6 |
| 11 | −1.93 | 0.1 | | |
| 12 | 3.7633 | 1.3 | 1.7292 | 54.7 |
| 13 | −1.75 | 0.35 | 1.8467 | 23.8 |
| 14 | 4.1 | 0.2 | | |
| 15 | 3.71289 | 0.9 | 1.5163 | 64.1 |

-continued

Numerical data 3-2
unit: mm

| 16 (aspherical surface) | −10.56729 | 0.746235 | | |
|---|---|---|---|---|
| 17 | ∞ | 1.6 | 1.5163 | 64.1 |
| 18 | ∞ | 0 | | |
| 19 (image surface) | | | | |

The radius of curvature for the surface number 6 is a radius of curvature of the fourth face of the reflecting/refracting optical element RL, that is, the circumferential face around the optical axis LC of the lens $L_{21}$.

Various data
half-field angle

| for front-direction-object side: | 60° |
|---|---|
| for substantially-lateral-direction-object side (minimum angle~maximum angle): | 55°~90° |

Data regarding numerical conditions

| Condition (1) | $|n_{d\_RL1} - n_{d\_RL2}| < 0.3$ | 0.2847 |
|---|---|---|
| Condition (2) | $|v_{d\_RL1} - v_{d\_RL2}| < 40$ | 29.1 |
| Condition (3) | $1 < |r_c/h| < 1.55$ | 1.487179487 |

Regarding lenses constituting an optical system of the present invention, shapes and numbers are not limited to those disclosed in the above-described embodiments. Various optical systems including reflecting/refracting optical elements also are in the scope. Further, the reflecting/refracting optical element may be composed of three or more lens elements made of glass materials having identical or substantially the same optical characteristics.

Although not arranged in the above-described embodiments, an image sensor may be arranged on the image side of the optical system. Further, a lowpass filter treated with IR cutoff coating, a CCD cover glass and the like may be arranged between the optical system and this image sensor.

While each of the optical systems is composed of three lens units in the above-described embodiments, an optical system of the present invention is not limited to these examples, but may be composed of two lens units or more than four lens units.

In the above-described embodiments, the fourth face RLd of the reflecting/refracting optical element RL is shaped such that its front-direction-object-side diameter substantially coincides with its image-side diameter. However, those shaped to have the image-side diameter larger than the front-direction-object-side diameter or to have the image-side diameter smaller than the front-direction-object-side diameter may be used. The front-direction-object-side diameter is defined as a diameter measured at the most front-direction-object-side position of the fourth face RLd in a plane perpendicular to the optical axis, and the image-side diameter is defined as a diameter measured at the most image-side position of the fourth face RLd in a plane perpendicular to the optical axis. Further, while the fourth face RLd of the reflecting/refracting optical element RL is formed between the first face RLa and the second face RLb over the entire circumferential face in the above-described embodiments, it is not always necessary to be formed over the entire circumferential face, but may be formed as a transmitting surface only in a partial region of the circumferential face.

Further, in each of the above-described embodiments, the first reflecting surface $RLa_2$ and the second reflecting surface $RLb_2$ are formed by deposition. However, forming method is not limited to this.

What is claimed is:

1. An optical system for observing a front-direction object and a substantially-lateral-direction object, the optical system comprising, in order from a front-direction-object side:
a front group with a negative refracting power having a reflecting/refracting optical element;
an aperture stop; and
a rear group with a positive refracting power;
wherein the reflecting/refracting optical element is constructed of a first lens and a second lens arranged on an image side of the first lens, which are cemented together; has a first face that is formed on the front-direction-object side of the first lens and that has a first transmitting surface formed with an optical axis being at a center thereof and a first reflecting surface annularly formed around the first transmitting surface and directed toward the image side, a second face that is formed at a cemented surface between the first lens and the second lens and that has a second transmitting surface formed with the optical axis being at a center thereof and a second reflecting surface annularly formed around the second transmitting surface and directed toward the front-direction-object side, a third face formed as a transmitting surface on the image side of the second lens, and a fourth face formed as a transmitting surface on a circumferential face of the first lens; and satisfies the following conditions:

$$|n_{d\_RL1} - n_{d\_RL2}| < 0.3$$

$$|v_{d\_RL1} - v_{d\_RL2}| < 40$$

where $n_{d\_RL1}$ is a refractive index of the first lens for d-line rays, $n_{d\_RL2}$ is a refractive index of the second lens for d-line rays, $v_{d\_RL1}$ is an Abbe's number of the first lens for d-line rays, and $v_{d\_RL2}$ is an Abbe's number of the second lens for d-line rays, and wherein the cemented surface is formed to be concave toward the image side.

2. The optical system according to claim 1, wherein the first lens and the second lens are made of glass materials having a same refractive index or a same Abbe's number.

3. The optical system according to claim 1, wherein the first lens and the second lens are made of an identical glass material.

4. The optical system according to claim 1, wherein the front group includes a first lens unit with a negative refracting power and a second lens unit and the rear group includes a third lens unit with a positive refracting power, and wherein the first lens unit, the second lens unit, the aperture stop and the third lens unit form a first optical system for observation of the front-direction object, and the second lens unit, the aperture stop and the third lens unit form a second optical system for observation of the substantially-lateral-direction object.

5. The optical system according to claim 1, wherein light from the front-direction-object side, after being incident on the first transmitting surface, is transmitted through the second transmitting surface and is made emergent toward the image side as being transmitted through the third face, and light from the substantially-lateral-direction-object side, after being incident on the fourth face, is sequentially reflected at the second reflecting surface and the first reflecting surface, is transmitted through the second transmitting surface and is made emergent toward the image side as being transmitted through the third face.

6. The optical system according to claim 1, wherein the third face is formed to be concave toward the image side.

7. The optical system according to claim 1, wherein the second lens has a negative refractive power.

8. An optical system for observing a front-direction object and a substantially-lateral-direction object, the optical system comprising, in order from a front-direction-object side:
- a front group with a negative refracting power having a reflecting/refracting optical element;
- an aperture stop; and
- a rear group with a positive refracting power;
wherein the reflecting/refracting optical element is constructed of a first lens and a second lens arranged on an image side of the first lens, which are cemented together; has a first face that is formed on the front-direction-object side of the first lens and that has a first transmitting surface formed with an optical axis being at a center thereof and a first reflecting surface annularly formed around the first transmitting surface and directed toward the image side, a second face that is formed at a cemented surface between the first lens and the second lens and that has a second transmitting surface formed with the optical axis being at a center thereof and a second reflecting surface annularly formed around the second transmitting surface and directed toward the front-direction-object side, a third face formed as a transmitting surface on the image side of the second lens, and a fourth face formed as a transmitting surface on a circumferential face of the first lens; and satisfies the following conditions:

$$|n_{d\_RL1} - n_{d\_RL2}| < 0.3$$

$$|v_{d\_RL1} - v_{d\_RL2}| < 40$$

where $n_{d\_RL1}$ is a refractive index of the first lens for d-line rays, $n_{d\_RL2}$ is a refractive index of the second lens for d-line rays, $v_{d\_RL1}$ is an Abbe's number of the first lens for d-line rays, and $v_{d\_RL2}$ is an Abbe's number of the second lens for d-line rays, and wherein the following condition is satisfied:

$$1 < |r_c/h| < 1.55$$

where $r_c$ is a radius of curvature of the cemented surface, and h is an effective radius of the cemented surface.

* * * * *